United States Patent
Makino et al.

(10) Patent No.: US 6,246,760 B1
(45) Date of Patent: Jun. 12, 2001

(54) SUBBAND ECHO CANCELLATION METHOD FOR MULTICHANNEL AUDIO TELECONFERENCE AND ECHO CANCELLER USING THE SAME

(75) Inventors: Shoji Makino, Machida; Suehiro Shimauchi; Yoichi Haneda, both of Tokyo; Akira Nakagawa, Kokubunji; Junji Kojima, Tokyo, all of (JP)

(73) Assignee: Nippon Telegraph & Telephone Corporation, Tokyo (JP)

( * ) Notice: Subject to any disclaimer, the term of this patent is extended or adjusted under 35 U.S.C. 154(b) by 0 days.

(21) Appl. No.: 08/927,961

(22) Filed: Sep. 11, 1997

(30) Foreign Application Priority Data

Sep. 13, 1996 (JP) .................................................. 8-243524

(51) Int. Cl.[7] .............................. H04M 1/00; H04M 9/08; H04M 9/00
(52) U.S. Cl. ........................................... 379/410; 379/406
(58) Field of Search .................................. 379/410, 411, 379/406, 407, 408, 409, 201, 202; 370/286, 287, 291; 381/66, 94.1, 71.1

(56) References Cited

U.S. PATENT DOCUMENTS

| | | | |
|---|---|---|---|
| 5,272,695 | * | 12/1993 | Makino et al. ........................ 379/410 |
| 5,323,459 | * | 6/1994 | Hirano .................................... 381/66 |
| 5,661,813 | * | 8/1997 | Shimauchi et al. ..................... 381/66 |
| 5,721,782 | * | 2/1998 | Piket et al. ............................. 381/66 |
| 5,761,318 | * | 6/1998 | Shimauchi et al. ..................... 381/66 |
| 5,774,561 | * | 6/1998 | Nakagawa et al. ..................... 381/66 |
| 5,818,945 | * | 10/1998 | Makino et al. .......................... 381/66 |
| 5,889,857 | * | 3/1999 | Boudy et al. .......................... 379/410 |

* cited by examiner

Primary Examiner—Stella Woo
(74) Attorney, Agent, or Firm—Connolly Bove Lodge & Hutz LLP

(57) ABSTRACT

In a subband echo cancellation for a multichannel teleconference, received signals $x_1(k), x_2(k), \ldots, x_I(k)$ of each channel are divided into N subband signals, an echo $y(k)$ picked up by a microphone $16_j$ after propagation over an echo path is divided into N subband signals $y_0(k), \ldots, y_{N-1}(k)$, and vectors each composed of a time sequence of subband received signals $x_1(k), \ldots, x_I(k)$ are combined for each corresponding subband. The combined vector and an echo cancellation error signal in the corresponding subband are input into an estimation part $19_n$, wherein a cross-correlation variation component is extracted. The extracted component is used as an adjustment vector to iteratively adjust the impulse response of an estimated echo path. The combined vector is applied to an estimated echo path $18_n$ formed by the adjusted value to obtain an echo replica. An echo cancellation error signal $e_n(k)$ is calculated from the echo replica and a subband echo $y_n(k)$.

25 Claims, 24 Drawing Sheets fs : SAMPLING FREQ

SUBBAND ECHO CANCELLATION METHOD FOR MULTICHANNEL AUDIO TELECONFERENCE AND ECHO CANCELLER USING THE SAME

BACKGROUND OF THE INVENTION

The present invention relates to an echo cancellation method for cancelling room echoes which would otherwise cause howling and give rise to psychoacoustic problems in a teleconferencing system using a multi-receive-system and, more particularly, to a subband echo cancellation method and apparatus for a multichannel audio teleconference which updates or corrects an estimated impulse response of an echo path for each subband through utilization of a projection algorithm or the like.

ONE-CHANNEL ECHO CANCELLATION

An echo canceller is used to offer a hands-free telecommunication system that has an excellent double-talk function and is virtually free from echoes.

A description will be given first, with reference to FIG. 1, of a one-channel echo canceller. In hands-free communication, speech uttered by a person at a remote place is provided as a received signal to a received signal terminal 11 and is radiated from a loudspeaker 12 directly or after being subjected to some processing by a received signal processing part 13 that automatically adjusts the gain of the received signal according to its amplitude, power or similar magnitude. For this reason, the received signal $x_1(k)$ herein mentioned is not limited specifically to the received signal itself but shall refer to a processed received signal as well when the received signal processing part 13 is employed. In FIG. 1, k indicates discrete time. An echo canceller 14 cancels an echo y(k) which is produced when the received signal $x_1(k)$ radiated from the loudspeaker 12 is picked up by a microphone 16 after propagating over an echo path 15. The echo $y_1(k)$ can be modeled by such a convolution as follows:

$$y_1(k) = \sum_{l=0}^{L-1} h_{11}(k, l) x_1(k-l) \quad (1)$$

where Σ indicates a summation from l=0 to L−1, $h_{11}(k,n)$ is the impulse response indicating the transfer function of the echo path 15 at time k and L is the number of taps, which is a constant preset corresponding to the reverberation time of the echo path 15. In the first place, received signals $x_1(k)$ from the current time to L−1 are stored in a received signal storage and vector generating part 17. The L received signals thus stored are outputted as a received signal vector $x_1(k)$, that is, as $$x_1(k)=[x_1(k), x_1(k-1), \ldots, x_1(k-L+1)]^T \quad (2)$$

where $*^T$ indicates a transposition. In an estimated echo generating part 18, the inner product of the received signal vector $x_1(k)$ of Eq. (2) and an estimated echo path vector $\hat{h}_{11}(k)$, which is provided from an echo path estimating part 19, is calculated as follows:

$$\hat{y}_1(k)=\hat{h}_{11}^T(k)x_1(k) \quad (3)$$

As a result, an estimated echo or echo replica $\hat{y}_1(k)$ is generated. This inner product calculation is equivalent to such a convolution as Eq. (1). In the echo path estimating part 19, the estimated echo path vector $\hat{h}_{11}(k)$ is generated which is used in the estimated echo generating part 18.

Since the impulse response $h_{11}(k,1)$ of the echo path 15 from the loudspeaker 12 to the microphone 16 varies with a sound field variation by a movement of a person or object, for instance, the estimated echo path vector $\hat{h}_{11}(k)$ needs to be varied following the time-varying impulse response of the echo path 15. In this example, the echo canceller 14 is formed by an adaptive FIR (Finite Impulse Response) filter. The most common algorithm for the echo path estimation is an NLMS (Normalized Least Mean Square) algorithm. With the NLMS algorithm, the received signal vector $x_1(k)$ at time k and a residual echo $e_1(k)$, i.e. the following error, obtained by subtracting the estimated echo signal $\hat{y}_1(k)$ from the output $y_1(k)$ of the microphone 16 by a subtractor 21, $$e_1(k)=y_{1(k)}-\hat{y}_1(k) \quad (4)$$

are used to calculate an estimated echo path vector $\hat{h}_{11}(k+1)$ which is used at time k+1, by the following equation:

$$\hat{h}_{11}(k+1)=\hat{h}_{11}(k)+\mu e_1(k)x_1(k)/(x_1^T(k)x_1(k)) \quad (5)$$

where μ is called a step size parameter, which is used to adjust adaptation within the range of 0<μ<2. By repeating the above processing, the estimated echo path vector $\hat{h}_{11}(k)$ in the echo path estimating part 19 can be gradually brought into agreement with a true echo path vector $h_{11}(k)$ whose elements are impulse response sequences $h_{11}(k, 1)$ of the true echo path 15, that is, the following echo path vector:

$$h_{11}(k)=[h_{11}(k,0), h_{11}(k,1), \ldots, h_{11}(k,L-1)]^T \quad (6)$$

As the result of this, the residual echo $e_1(k)$ given by Eq. (4) can be reduced.

The most effective algorithm now in use for the echo path estimation is a projection algorithm or ES projection algorithm (hereinafter referred to as an ESP algorithm). The projection algorithm is based on an idea of improving the convergence speed for correlated signals such as speech by removing the auto-correlation between input signals in the algorithm. The removal of auto-correlated components means whitening of signals in the time domain. The projection algorithm is described in detail in K. Ozeki and T. Umeda, "An Adaptive filtering Algorithm Using an orthogonal Projection to an Affine Subspace and Its Properties," Trans.(A), IEICE Japan, vol.J67-A, No.2, pp.126–132, February, 1984.

In general, the p-order projection algorithm updates the estimated echo path vector $\hat{h}(k)$ in such a manner as to obtain correct outputs y(k), y(k−1), . . . , y(k−p+1) for the last p input signal vectors x(k), x(k−1), . . . , x(k−p+1). That is, $\hat{h}(k+1)$ is computed which satisfies the following equations:

$$x^T(k)\hat{h}(k+1)=y(k)$$

$$x^T(k-1)\hat{h}(k+1)=y(k-1)$$

$$x^T(k-p+1)\hat{h}(k+1)=y(k-p+1) \quad (7)$$

where $$x(k)=[x(k),x(k-1),\ldots,x(k-L+1)]^T \quad (8)$$

When the number p of equations is smaller than the number of unknown numbers (the number of taps) L, the solution $\hat{h}(k+1)$ of the simultaneous equations (7) is indeterminate. Hence, the estimated echo path vector is updated to minimize the value or magnitude of the updating $\|\hat{h}(k+1)-\hat{h}(k)\|$. The p-order projection algorithm in such an instance is expressed by the following equation:

$$\hat{h}(k+1)=\hat{h}(k)+\mu[X^T(k)]^+e(k) =\hat{h}(k)+\mu X(k)[X^T(k)X(k)]^{-1}e(k) =\hat{h}(k)+\mu X(k)\beta(k) =\hat{h}(k)+\mu[\beta_1 x(k)+\beta_2 x(k-1)+\ldots+\beta_p x(k-p+1)] \quad (9)$$

where $$X(k)=[x(k),x(k-1),\ldots,x(k-p+1)] \quad (10)$$

$$e(k)=[e(k),(1-\mu)e(k-1),\ldots,(1-\mu)^{P-1}e(k-p+1)]^T \quad (11)$$

$$e(k)=y(k)-\hat{y}(k) \quad (12)$$

$$\hat{y}(k)=\hat{h}(k)^T X(k) \quad (13)$$

$$\beta(k)=[\beta_1,\beta_2,\ldots,\beta_P]^T \quad (14)$$

$^+$: generalized inverse matrix
$^{-1}$: inverse matrix.
In the above, $\beta(k)$ is the solution of the following simultaneous linear equation with p unknowns:

$$[X^T(k)X(k)]\beta(k)=e(k) \quad (15)$$

To avoid instability in the inverse matrix operation, a small positive constant $\delta$ may be used as follows:

$$[X^T(k)X(k)+\delta I]\beta(k)=e(k) \quad (15)'$$

where I is a unit matrix. The second term on the right-hand side of Eq. (9) is an updated vector, with which the estimated echo path vector is iteratively updated. $X(k)\beta(k)$ in Eq. (9) represents processing for removing the auto-correlation of the input signal. The removal of auto-correlation means suppression of input signal variations in the time domain, and hence it means whitening of the signals in the time domain. That is, the projection algorithm can be said to increase the impulse response updating speed by the whitening of the input signal in the time domain. Several fast projection algorithms have been proposed to reduce the computational complexity, and they are described in detail in $[X^T(k)AX(k)]\beta(k)=e(k)$ Japanese Patent Application Laid-Open Gazettes Nos. 312535/95 and 92980/95. Further, setting the input/output at a negative time zero and p infinity corresponds to the RLS algorithm.

The ESP algorithm is a combination of the projection algorithm with the ES algorithm that only reflects the variation characteristic of the echo path and permits implementation of an echo canceler of higher convergence speed than does the projection algorithm. The p-order ESP algorithm can be expressed by the following equation:

$$\hat{h}(k+1)=\hat{h}(k)+\mu[\{AX(k)\}]^+e(k) =(k)+\mu AX(k)[X^T(k)AX(k)]^{-1}e(k) =\hat{h}(k)+\mu AX(k)\beta(k) =\hat{h}(k)+\mu A[\beta_1 x(k)+\beta_2 x(k-1)+\ldots+\beta_P x(k-p+1)] \quad (16)$$

where:

$A=\text{diag}[\alpha_1,\alpha_2,\ldots,\alpha_L]$: step size matrix
$\alpha_i=\alpha_0\lambda^i$ (i=1,2,...,L)
$\lambda$: attenuation rate of impulse response variation ($0<\lambda<1$)
$\mu$: second step size (scalar quantity)

In the above, $\beta(k)$ is the solution of the following simultaneous linear equation with p unknowns:

$$(17)$$

To avoid instability in the inverse matrix operation, a small positive constant $\delta$ may be used as follows:

$$(17)'$$

where I is a unit matrix.

When the estimated echo path 18 is formed by a digital FIR filter, its filter coefficient vector $\hat{h}_{11}(k)$ is a direct simulation of the impulse response $h_{11}(k)$ of the room echo path 15. Accordingly, the $[X^T(k)AX(k)+\delta I]\beta(k)=e(k)$ value of adjustment of the filter coefficient that is required according to variations of the room echo path 15 is equal to the variation in its impulse response $h_{11}(k)$. Then, the step size matrix A, which represents the step size in the filter coefficient adjustment, is weighted using the time-varying characteristic of the impulse response. The impulse response variation in a room sound field is usually expressed as an exponential function using the attenuation rate $\lambda$. As depicted in FIG. 2A, the diagonal elements $\alpha_1$ (where 1=1,2,...,L) of the step size matrix A exponentially attenuates, as 1 increases, from $\alpha_0$ and gradually approaches zero with the same gradient as that of the exponential attenuation characteristic of the impulse response. This algorithm utilizes an acoustics finding or knowledge that when the impulse response of a room echo path varies as a person or object moves, its variation (a difference in the impulse response) exponentially attenuates with the same attenuation rate as that of the impulse response. By adjusting initial coefficients of the impulse response with large variations in large steps and the subsequent coefficients with small variations in small steps, it is possible to offer an echo canceler of fast convergence.

In the case of constructing the echo canceler with plural DSP (Digital Signal Processor) chips, the exponential decay curve of the step size $\alpha_1$ is approximated stepwise and the step size $\alpha_1$ is set in discrete steps with a fixed value for each chip as shown in FIG. 2B. This permits implementation of the ESP algorithm with the computational load and storage capacity held about the same as in the case of the conventional projection algorithm. The ESP algorithm is described in detail in S. Makino and Y. Kaneda, "Exponentially weighted step-size projection algorithm for acoustic echo cancellers", Trans. IEICE Japan, vol. E75-A, No. 11, pp. 1500–1508, November, 1992.

In the case of adjusting the estimated echo path vector $h(k)$ by the conventional NLMS algorithm based on Eq. (5), it is adjusted in the direction of the input signal vector $x(k)$. on the other hand, according to the ESP algorithm based on Eqs. (9) and (16), the second term on the right side of the fourth equation of Eq. (9) and (16) is set as follows:

$$v(k)=\beta_1 x(k)+\beta_2 x(k-1)+\ldots+\beta_P x(k-p+1) \quad (18)$$

and the estimated echo path vector $h(k)$ is adjusted in the direction of the vector $v(k)$, that is, in the direction in which the correlation (auto-correlation) to all of previous combined input signal vectors $x(k-1),\ldots,x(k-p+1)$ has been removed from the current combined vector $x(k)$ of input signals. In other words, the coefficients $\beta_1$ to $\beta_P$ are determined so that vectors similar to the previous input signal vectors are removed as much as possible from the current adjusted input signal vector $v(k)$. In consequence, the input signal is whitened in the time domain.

As described above, the conventional projection algorithm whitens the monoral input signal in the time domain by removing the auto-correlation component of the input signal so as to provide increased convergence speed of the echo path estimation. The afore-mentioned Makino et al literature shows the results of computer simulations of convergence of ERLE (Echo-Return-Loss-Enhancement) by the ESP algorithm and by the NLMS algorithm in the case where the received signal was a male voice. According to the results of computer simulations, the time for the ERLE to reach 20 dB is about 1 sec in the case of the NLMS algorithm and 0.2 sec or less in the case of the ESP algorithm, and the time for substantial convergence of the ERLE is approximately in the range of 1 to 3 sec at the longest in either algorithm. This is considered to indicate the whitening effect of the input signal.

On the other hand, there is known a subband scheme that increases the convergence speed of the echo path estimation by whitening the monoral input signal in the frequency domain. This scheme divides the input signal into plural subbands, then sequentially adjusts in each subband the filter coefficient of the estimated echo path 18 based on variations of the echo path 15 by the NLMS algorithm or the like, and combines and outputs residuals in the respective subbands. This is disclosed in, for instance, U.S. Pat. No. 5,272,695, S. Gay and R. Mammone, "Fast converging subband acoustic echo cancellation using RAP on the $WE^R$ DSP16A", Proc. ICASSP90, pp. 1141–1144, April 1990, and Makino et al, "Subband Echo Canceller with an Exponentially Weighted Stepsize NLMS Adaptive Filter", Trans. IEICE Japan, A Vol. 379-A, No. p6, pp.1138–1146, June 1996. This subband scheme involves flattening or what is called whitening of signals in the frequency domain, increasing the convergence speed in the estimation of the filter coefficient of the estimated echo path at the time of variations of the echo path. This subband scheme is used in the echo path estimation for a one-channel input signal and increases the convergence speed of the echo cancellation by flattening (whitening) of the signal in each subband. This is attributable to the whitening of the signal and hence has nothing to do with the number of channels of the input signal. That is, in a teleconferencing system using plural loudspeakers and plural microphones the application of the subband scheme to each of the multichannel input signals would produce the same whitening effect as described above. However, it has not been considered that the subband scheme could be expected to produce any further effects.

Echo Cancellation for Teleconferencing System

In general, a teleconferencing system of the type having an I ($\geq 2$) channel loudspeaker system and a J ($\geq 1$) channel microphone system employs, for echo cancellation, such a configuration as shown in FIG. 3. That is to say, an echo cancellation system 23 is composed of I-channel echo cancellers $22_1, 22_2, \ldots, 22_J$ for processing I-input-one-output time sequence signals, which are each interposed between all of I channels of the receiving (loudspeaker) side and one channel of the sending (microphone) side. In this instance, the echo cancellation system has a total of I×J echo paths $15_{ij}$ ($1 \leq i \leq I$, $1 \leq j \leq J$). The I-channel echo cancellers $22_1, 22_2, \ldots, 22_J$, which are each connected between all of the I channels of the receiving side and one channel of the sending side, have such a configuration as shown in FIG. 4, which is an extended version of the configuration of the echo canceller 14 depicted in FIG. 1. This is described in detail, for example, in T.Fujii, S.Shimada "Multichannel Adaptive Digital Filter," Trans. IEICE Japan, '86/10, V ol.J69-A, No.10.

Now, consider the I-channel echo canceller $22_J$ connected to an j-th channel ($1 \leq j \leq J$) of the sending side. The echo signal that is picked up the j-th channel microphone $16_J$ is obtained by adding together respective received signals of all channels at the sending side after propagation over respective echo paths $15_{1j}$ to $15_{Ij}$. Hence, it is necessary to devise how to make the echo path estimation by evaluating only one residual echo ej(k) in common to all the receiving side channels. In the first place, for the received signal of each channel, the following received signal vectors are generated in the received signal storage and vector generating parts ($17_1, 17_2, \ldots 17_I$):

$$x_1(k)=[x_1(k), x_1(k-1), \ldots, x_1(k-L_1+1)]^T \quad (19)$$

$$x_2(k)=[x_2(k), x_2(k-1), \ldots, x_2(k-L_2+1)]^T \quad (20)$$

$$x_I(k)=[x_I(k), x_I(k-1), \ldots, x_I(k-L_I+1)]^T \quad (21)$$

where $L_1, L_2, \ldots, L_I$ are the numbers of taps, which are constants preset corresponding to reverberation times of the respective echo paths $15_{1j}, 15_{2j}, \ldots, 15_{Ij}$. The vectors thus generated are combined in a vector combining part 24 as follows:

$$x(k)=[x_1^T(k), x_2^T(k), \ldots, x_I^T(k)]^T \quad (22)$$

Also in the echo path estimating part $19_j$, estimated echo path vectors $\hat{h}_{1j}(k), \hat{h}_{2j}(k), \ldots, \hat{h}_{Ij}(k)$, which are used to simulate I echo paths between the respective receiving side channels and the j-th sending side channel, are combined as follows:

$$\hat{h}_j(k)=[\hat{h}_{1j}^T(k), \hat{h}_{2j}^T(k), \ldots, \hat{h}_{Ij}^T(k)]^T \quad (23)$$

In the case of using the NLMS algorithm, the updating of the combined estimated echo path vector $\hat{h}_j(k)$ is done as follows:

$$\hat{h}_j(k+1)=\hat{h}_j(k)+\mu e_j(k)x(k)/\{x^T(k)x(k)\} \quad (24)$$

In the estimated echo generating part $18_j$, an estimated echo $\hat{y}_j(k)$ for the echo $y_j(k)$ picked up in the j-th sending channel is generated by the following inner product calculation:

$$\hat{y}_j(k)=\hat{h}_j^T(k)x(k) \quad (25)$$

By combining vectors in the respective channels into one vector, the flow of basic processing becomes the same as in the one-channel echo canceller of FIG. 1.

Of the defects of the conventional echo cancellation system for application to the teleconferencing system composed of an I-channel speaker system and a J-channel microphone system, the defect that the present invention is to solve will be described in connection with a concrete example.

In the case of applying the conventional echo cancellation system to the stereo teleconferencing system which sends and receives signals between the points A and B over two channels as shown in FIG. 5, there is presented a problem that each time a speaker at the point A moves or changes to another, an echo from the point B by the speech at the point A increases even if the echo paths $15_{11}$ and $15_{21}$ remain unchanged. The reason for this is that the echo path impulse responses are not correctly estimated in the echo cancellation system at the Point B side.

To explain this problem, attention is paid to the operation of the echo canceller $22b_1$ connected to a first one of two sending channels of the echo cancellation system at the point B. To clarify the operation of each receiving channel, the element of the combined vector for each receive channel, used previously with respect to the prior art, will hereinafter be expressed in an explicit form. Let two-channel received signal vectors be represented as $x_1(k)$ and $x_2(k)$. Letting echo path vectors of true echo paths $15_{11}$ and $15_{21}$ of the respective receiving channels be represented as $h_{11}(k)$ and $h_{21}(k)$, respectively, an echo $y_1(k)$ that is picked up after having propagated over the echo paths $15_{11}$ and $15_{21}$ is given by $$y_1(k)=h_{11}^T(k)x_1(k)+h_{21}^T(k)x_2(k) \quad (26)$$

on the other hand, an echo replica $\hat{y}_1(k)$ that is generated in the echo canceller is expressed by the following equation using estimated echo path vectors $\hat{h}_{11}(k)$ and $\hat{h}_{21}(k)$ that are generated in the echo canceller:

$$\hat{y}_1(k) = \hat{h}_{11}^T(k)x_1(k) + \hat{h}_{21}^T(k)x_2(k) \quad (27)$$

When one speaker speaks or utters at the point A, the received signal vectors $x_1(k)$ and $X_2(k)$ have a very strong cross-correlation. When the received signal vectors $x_1(k)$ and $x_2(k)$ have a constant high cross-correlation, the combined vector $\{\hat{h}_{11}^T(k), \hat{h}_{21}^T(k)\}$ as the solution of the following equation (28) exists infinitely, forming a subspace $H_x$ inherent in the cross-correlation between the received signal vectors $x_1(K)$ and $X_2(k)$.

$$\hat{y}_1(k) = y_1(k) \quad (28)$$

On this account, in the case of using an ordinary iterative error minimization algorithm such as the NLMS algorithm, the combined vector $\{\hat{h}_{11}^T(k), \hat{h}_{21}^T(K)\}$ converges to a point where the distance from the initial value to the subspace $H_x$ is minimum; in general, it does not converge to the true value $\{h_{11}^T(k), h_{21}^T(k)\}$.

For simplicity, consider the case where the received signal vectors $x_1(k)$ and $x_1(k)$ are expressed by constant scalar values $p_1$ and $p_2$ and the source signal vector $s(k)$ as follows:

$$x_1(k) = p_1 s(k), \; x_2(k) = p_2 s(k) \quad (29)$$

The subspace $H_x$ where the solution $[\hat{h}_{11}^T(k), \hat{h}_{2l}^T(k)]$ of Eq. (28) is allowed to exist can be regarded as a straight line in FIG. 6A which satisfies the following equation:

$$p_1 \hat{h}_{11}(k) + p_2 \hat{h}_{21}(k) = p_1 h_{11}(k) + p_2 h_{21}(k) \quad (30)$$

When the adaptation starts from the initial value (0, 0), the steady-state solution $[\hat{h}_{11p}^T(k), \hat{h}_{21p}^T(k)]$ is obtained as follows:

$$\hat{h}_{11p}(k) = p_1^2 (h_{11}(k) + p_2 h_{21}(k)/p_1)/(p_1^2 + p_2^2) \neq h_{11}(k) \quad (31)$$

$$\hat{h}_{21p}(k) = p_2^2 (p_1 h_{11}(k)/p_2 + h_{21}(k))/(p_1^2 + p_2^2) \neq h_{21}(k) \quad (32)$$

Hence, Eq. (30) is no longer satisfied when the rate between the scalar values $P_1$ and $P_2$ varies, with the result that no echo can be canceled and the echo increases accordingly.

As will be seen from the above, in the case of applying the conventional echo canceller to the teleconferencing system composed of an I-channel loudspeaker system and a J-channel microphone system, if received signals of the respective channels have a cross-correlation, the echo path impulse responses cannot correctly be estimated—this gives rise to the problem that the echo increases upon each variation in the cross-correlation between the received signals.

As a solution to this problem, there is proposed in Japanese Patent Application Laid-Open Gazette No. 181639/96 (corresponding to U.S. patent application Ser. No. 08/547,5450) a method which extracts information about a variation in the cross-correlation between received signals of respective channels by the projection algorithm or the like and utilizes the extracted information as the adjusted vector for adjusting the echo path impulse response, thereby increasing the speed of convergence to the true value. Further, there is also proposed to vary the cross-correlation by forcefully introducing variations in amplitude, phase or noise between the input multichannel signals. With this method, the estimated echo path can be made to converge to the true echo path, but it is indicated that the convergence takes more than 20 sec. This proposed method, which adjusts the impulse response in the full band of each channel by the projection algorithm or the like, has a defect that the convergence speed is still low. Further, to increase the convergence speed requires a very high projection order, causing the problem of increased computational complexity.

Incidentally, the projection algorithm and the ESP algorithm increases the convergence speed by removing the auto-correlation of the input signal. On the other hand, the subband scheme that processes a one-channel signal in plural subbands increases the convergence speed by flattening (whitening) the input signal in the frequency domain. As referred to previously, the effect of increasing the convergence speed of the estimated echo path by whitening of the input signal shows up in a short time within several seconds after the rise of the convergence. In contrast to this, according to the method that varies the cross-correlati on between the multichannel signals as described above, the convergence starts in 10 to 15 sec—this method is very lower in convergence speed than in the case of whitening the input signal but ensures steady convergence of the estimated echo path to the true one. This suggests that the mechanism of increasing the convergence speed of the estimated echo path by whitening the input signal and the mechanism of increasing the convergence speed of the estimated echo path by varying the cross-correlation between multichannel signals entirely differ from each other.

It is therefore completely unknown what influence the application of the subband scheme, one of the whitening methods, to the multichannel signals will exert on their cross-correlation. The application of the subband scheme to the stereo echo canceller has been considered rather useless since it would not ever settle its problems mentioned previously. For this reason, the full band scheme has been used for echo cancellation for multichannel signals.

SUMMARY OF THE INVENTION

It is therefore an object of the present invention to provide an echo cancellation method and apparatus which obviate the afore-mentioned problems caused in the conventional echo cancellation system for the multichannel audio conference.

Another object of the present invention is to provide an echo cancellation method and apparatus for a multichannel audio teleconference which overcome the problem of low convergence speed of echo path estimation.

The echo cancellation method for a multichannel audio teleconference according to the present invention, comprises the steps of:

(a) dividing a received signal and an echo into N subbands in each channel and decimating them with predetermined decimation rates to generate N subband received signals and N subband echoes, N being an integer equal to or greater than 2;

(b) generating N echo replicas by providing the N subband received signals to N estimated echo paths each formed by a digital filter which is given a filter coefficient of a predetermined number of taps and simulates the impulse response of the echo path in each of the N subbands;

(c) subtracting the N echo replicas from the N subband echoes corresponding thereto to generate echo cancellation error signals in the N subbands;

(d) iteratively adjusting the filter coefficients of the digital filters to minimize the N echo cancellation error signals on the basis of the N echo cancellation error signals and the N subband received signals corresponding thereto; and (e) combining the echo cancellation error signals in the N subbands into a send signal of the full band with the echoes suppressed.

The echo canceller for a multichannel audio teleconference according to the present invention, comprises:

subband echo generating means for dividing a received signal and an echo into N subbands in each channel and for decimating them with predetermined decimation rates to generate N subband received signals and N subband echoes, N being an integer equal to or greater than 2;

N estimated echo path means, each formed by a digital filter which is given a filter coefficient of a predetermined number of taps and simulates the impulse response of the echo path in each of the N subbands, for generating N echo replicas when supplied with the N subband received signals;

error signal generating means for subtracting the N echo replicas from the N subband echoes corresponding thereto to generate echo cancellation error signals in the N subbands;

echo path estimating means for iteratively adjusting the filter coefficients of the digital filters to minimize the N echo cancellation error signals on the basis of the N echo cancellation error signals and the N subband received signals corresponding thereto; and subband combining means for combining the echo cancellation error signals in the N subbands into a send signal of the full band with the echoes suppressed.

DESCRIPTION OF THE PREFERRED EMBODIMENTS

A description will be given first of the operation of an echo path estimating part of the multichannel echo canceller in response to a variation in the cross-correlation between multichannel received signals on which the present invention is partly based.

Figure 6A:
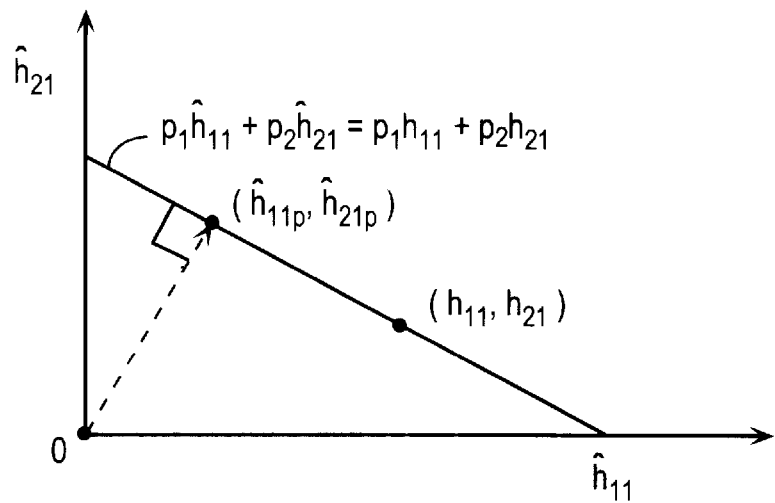
FIG. 6A is a graph showing an echo path estimation in the case of received signals having a cross-correlation to each other.
Figure 6B:
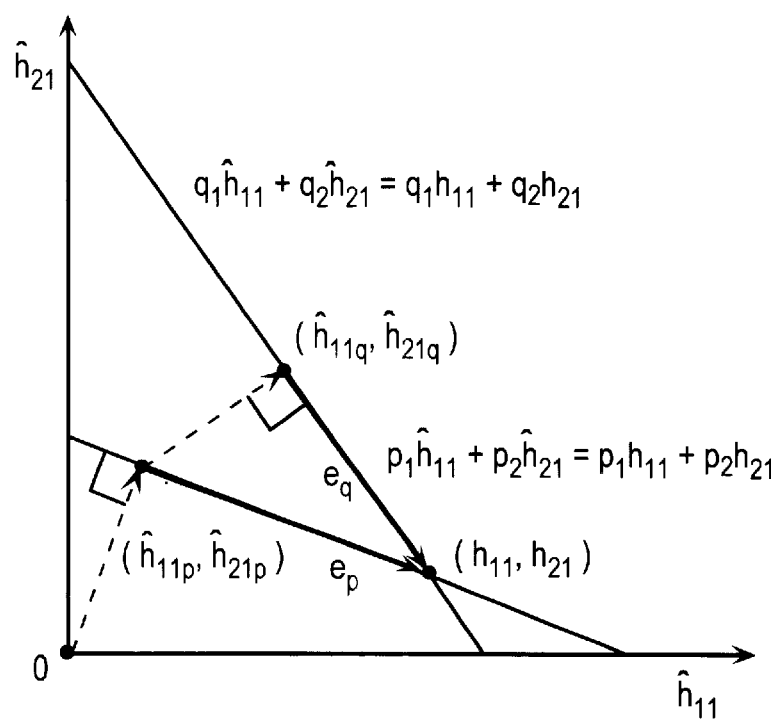
FIG. 6B is a graph showing an echo path estimation in the case where the cross-correlation varies.

For the sake of simplicity, consider, as a variation in the cross-correlation between the two-channel stereo received signals $x_1(k)$ and $x_2(k)$ expressed by Eq. (29), an example in which $P_1$ and $P_2$ in Eq. (29) change to $q_1$ and $q_2$ of a different ratio therebetween. In the first place, $[\hat{h}_{11}^T(k), \hat{h}_{21}^T(k)]$ converges to $[\hat{h}_{11p}^T(k), \hat{h}_{21p}^T(k)]$ of Eqs. (31) and (32). Then, when $p_1$ and $p_2$ change to $q_1$ and $q_2$, $[\hat{h}_{11p}^T(k), \hat{h}_{21p}^T(k)]$ converges, as an "initial value," to $[\hat{h}_{1lq}^T(k), \hat{h}21q^T(k)]$ nearest thereto. This is geometrically interpreted as depicted in FIGS. 6A and 6B. Here, a steady-state solution $(\hat{h}_{11q}^T, \hat{h}_{21q}^T)$ is a point of intersection of a straight line $\hat{h}_{11q1} + \hat{h}_{21Q1} = \hat{h}_{11q1} + \hat{h}_{21q2}$ and the normal thereto from a steady-state solution $(\hat{h}_{11p}^T, \hat{h}_{21p}^T)$. Accordingly, it is self-evident that the norms of filter coefficient error vectors $e_p$ and $e_q$ in FIG. 6B generally bear a relationship $\|e_p\| > \|e_q\|$. This means, in general, that upon each variation in the cross-correlation between the received signals, the norm of the filter coefficient error vector becomes smaller. That is, each variation in the cross-correlation between multichannel received signals may increase production of echoes when the echo estimation is incorrect in the echo canceller, but as the variation repeats, the estimated echo path converges toward the true echo path; hence, the variation in the cross-correlation between the multichannel received signals can be regarded as effective information that makes it possible to estimate the true echo path in the echo path estimating part. This is also disclosed in the afore-mentioned Japanese patent application Laid-Open Gazette No. 181639/96 (U.S. application Ser. No. 08/547,545).

The present invention is to provide increased convergence speed of the echo path estimation by processing multichannel signals in a manner to emphasize their cross-correlation. The method for emphasizing the cross-correlation is based on a finding that the decimation of samples in the subband scheme, conventionally applied as a signal whitening scheme to single-channel signal processing, is effective in emphasizing the cross-correlation between multichannel signals.

The multichannel echo cancellation according to the present invention has first, second and third methods.

The first method employs the subband scheme for the multichannel echo cancellation. As in the case of using the subband scheme in the conventional one-channel echo cancellation, the input signal is flattened (whitened) in the frequency domain and, further, the time interval between samples is increased by sample decimation involved in the subband scheme, so that the variation in the cross-correlation between multichannel signals is emphasized. By this, the convergence speed of the true value estimation further increases.

According to the second method, an adjustment vector is calculated from the echo cancellation error signal and the received signal of each channel in the first method and the adjustment vector is used to iteratively adjust the estimation of the impulse response of each echo path; in this instance, according to the present invention, a variation component of the cross-correlation between current received signals corresponding to the cross-correlation between previous received signals is extracted and uses it as the adjustment vector. For example, the ESP algorithm is used to emphasize the variation in the cross-correlation between respective channels. With the use of the ESP algorithm in the subband multichannel echo canceller, the effect of emphasizing the cross-correlation variation by the subband scheme is multiplied by the emphasizing effect of the ESP algorithm—this produces an unexpected effect, achieving a very high convergence speed with a low projection order. Moreover, by setting the projection order at an optimum value in each subband, the maximum effect could be produced with a small computational load.

The third method utilizes a function that permits the cross-correlation between the received signals in the first method to actively vary as long the variation remains psychoacoustically natural, then the acoustic signal is reproduced by each loudspeaker, and the received signal added with the variation in the cross-correlation is used to obtain the adjustment vector for the estimated echo vector. Furthermore, by setting the function at a different optimum value in each subband, a psychoacoustic degradation could be minimized.

Figure 1:
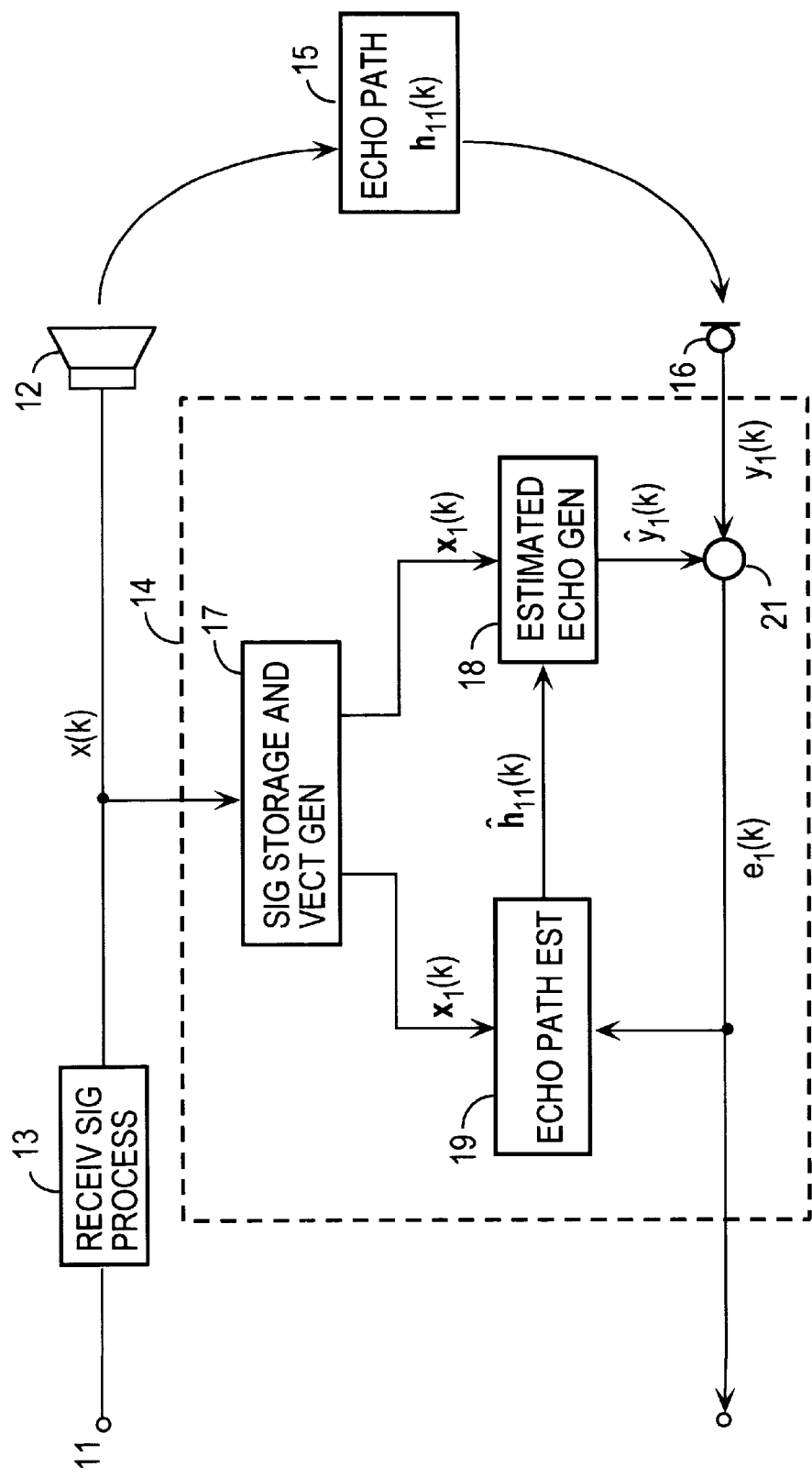
FIG. 1 is a block diagram showing an example of the functional configuration of a conventional one-channel echo canceler.
Figure 2A:
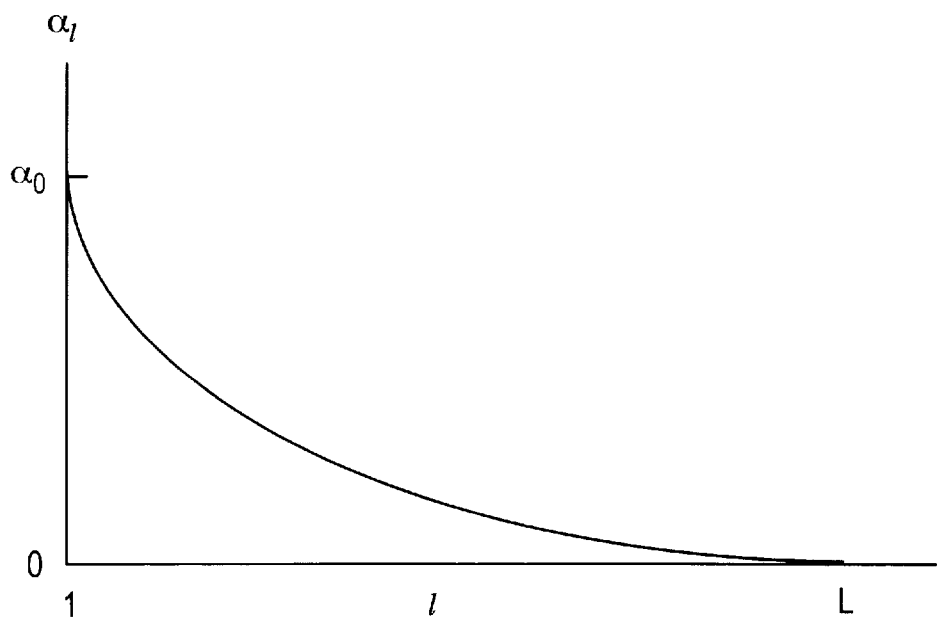
FIG. 2A is a graph showing an example of the diagonal component $\alpha_1$ of a strep size matrix A.
Figure 2B:
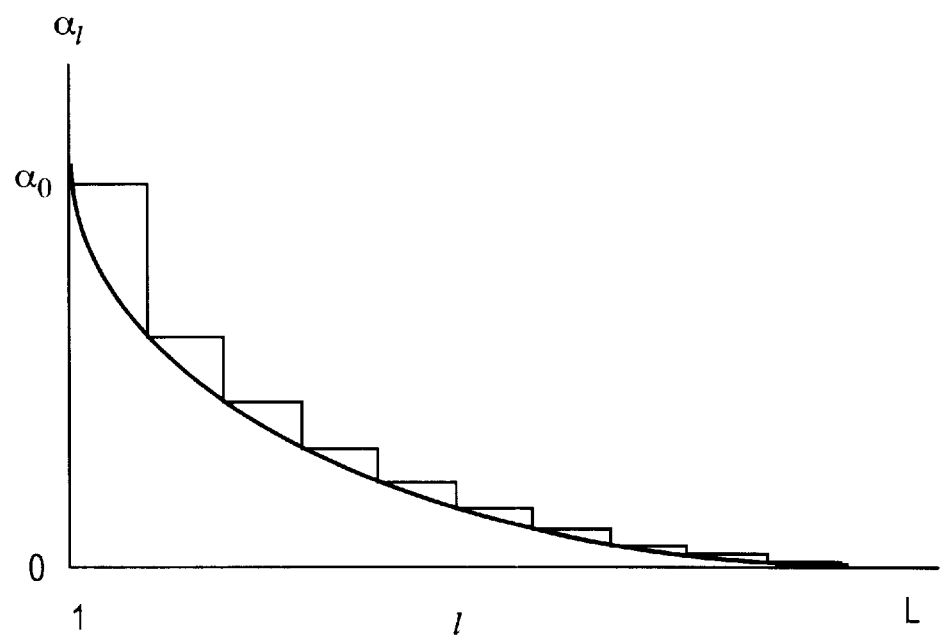
FIG. 2B is a graph sowing an example of a stepwise approximation of the diagonal component $\alpha_1$ of the step size matrix A.
Figure 3:
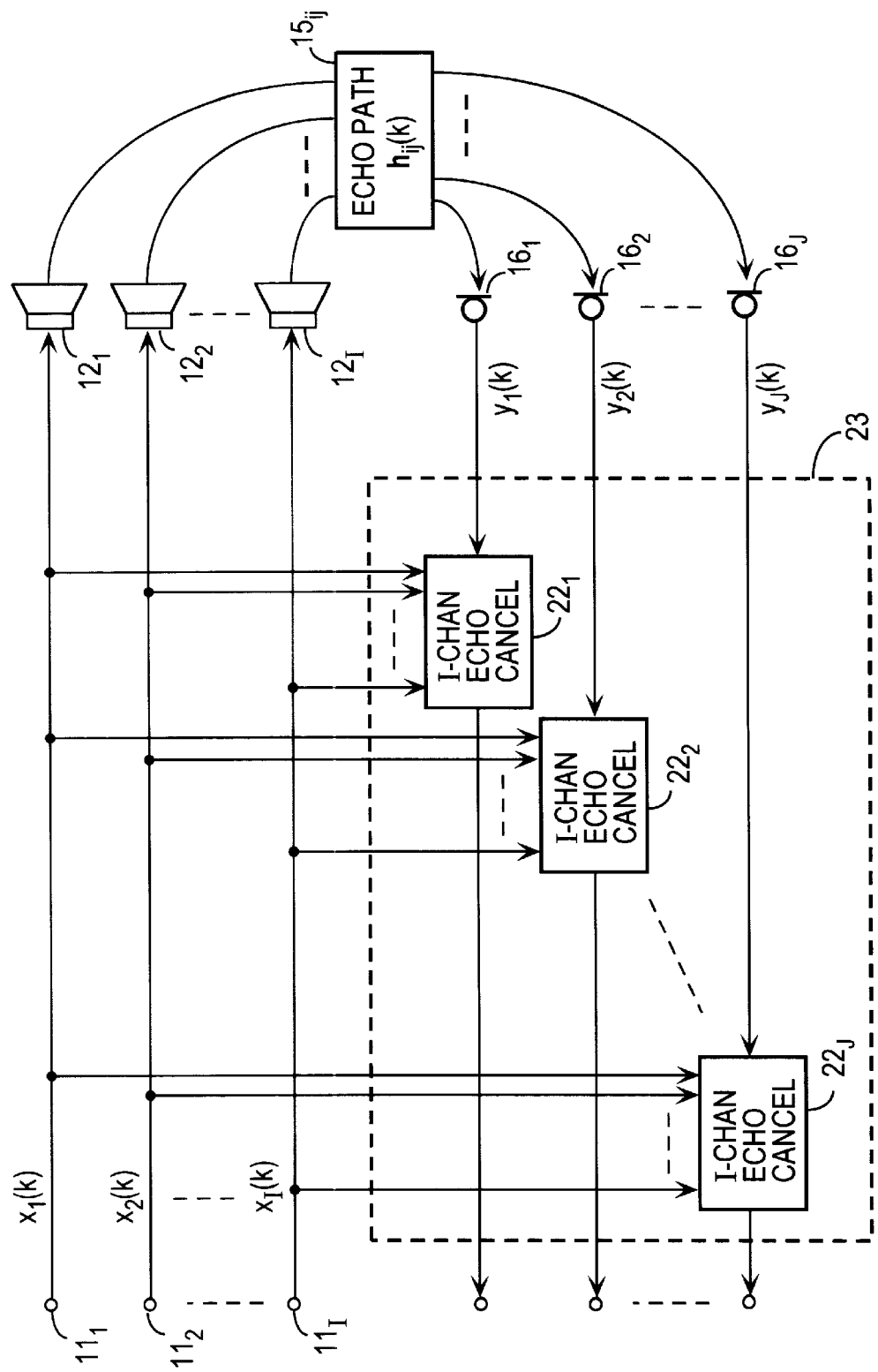
FIG. 3 is a block diagram showing a conventional multichannel echo canceller system.
Figure 7:
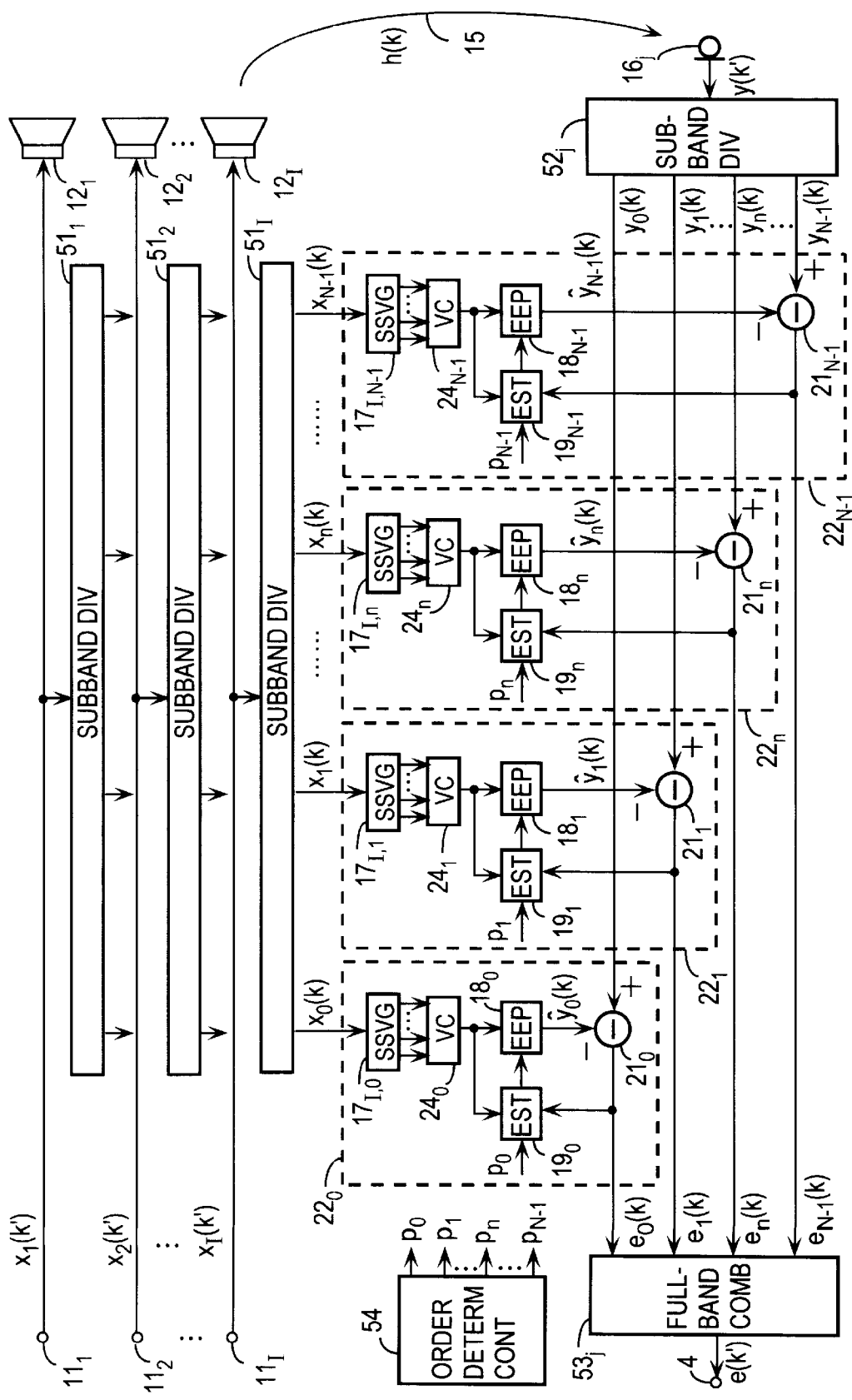
FIG. 7 is a block diagram illustrating an example of the functional configuration of an embodiment of the present invention.

In FIG. 7 there is illustrated in block form an example of the functional configuration of an echo canceler embodying the echo cancellation method of the present invention which employs the above-mentioned first and second methods, the parts corresponding to those in FIG. 3 being identified by the same reference numerals. The received signal $x_i(k')$ is reproduced by the loudspeaker $12_i$ into speech and, at the same time, the received signal is fed to a subband analysis part $51_i$, wherein it is converted to a digital signal and divided into N real-number signals $x_{in}(k)$ (where n=0,1, ... ,N−1). On the other hand, the reproduced speech from the loudspeaker $12_i$ propagates over the echo path $15_{ij}$ and is picked up as the echo $y_i(k')$ by the microphone $16_j$. The echo $y_i(k')$ is fed to a subband analysis part $52_j$, wherein it is converted to a digital signal, which is divided with the same dividing characteristic as that of the subband analysis part $51_i$ into N real-number signals $y_{in}(k)$ of the respective subbands. In the following description, j will be omitted for simplicity, since the same processing is carried out for all j's.

In each of the subbands divided by the subband analysis part $51_i$ there is provided I-channel echo canceller $22_n$ which is composed of a received signal storage/vector generating part $17_{in}$, a vector combining part $24_n$, an estimated echo path $18_n$ and an echo path estimating part $19_n$. The estimated echo path $18_n$ generates an echo replica $\hat{y}_n(k)$ and subtracts it by a subtractor $21_n$ from the corresponding subband echo $y_n(k)$ to cancel it. The estimated echo path $18_n$ needs to follow temporal variations of the echo path $15$; in this instance, the estimated echo path vector $\hat{h}_n(k)$ is iteratively estimated by the estimation part $19_n$ using the projection or ESP algorithm so that the error $e_n(k)=y_n(k)-\hat{y}_n(k)$ approaches zero. By this, the estimated echo path $18_n$ is adjusted, ensuring an optimum echo cancellation at all times. The error signals (residual signals) $e_n(k)$ in the respective subbands are combined by a subband synthesis part $53_j$ into an error signal $e(k')$ of the full band, which is provided to the send out terminal 4.

Figure 8:
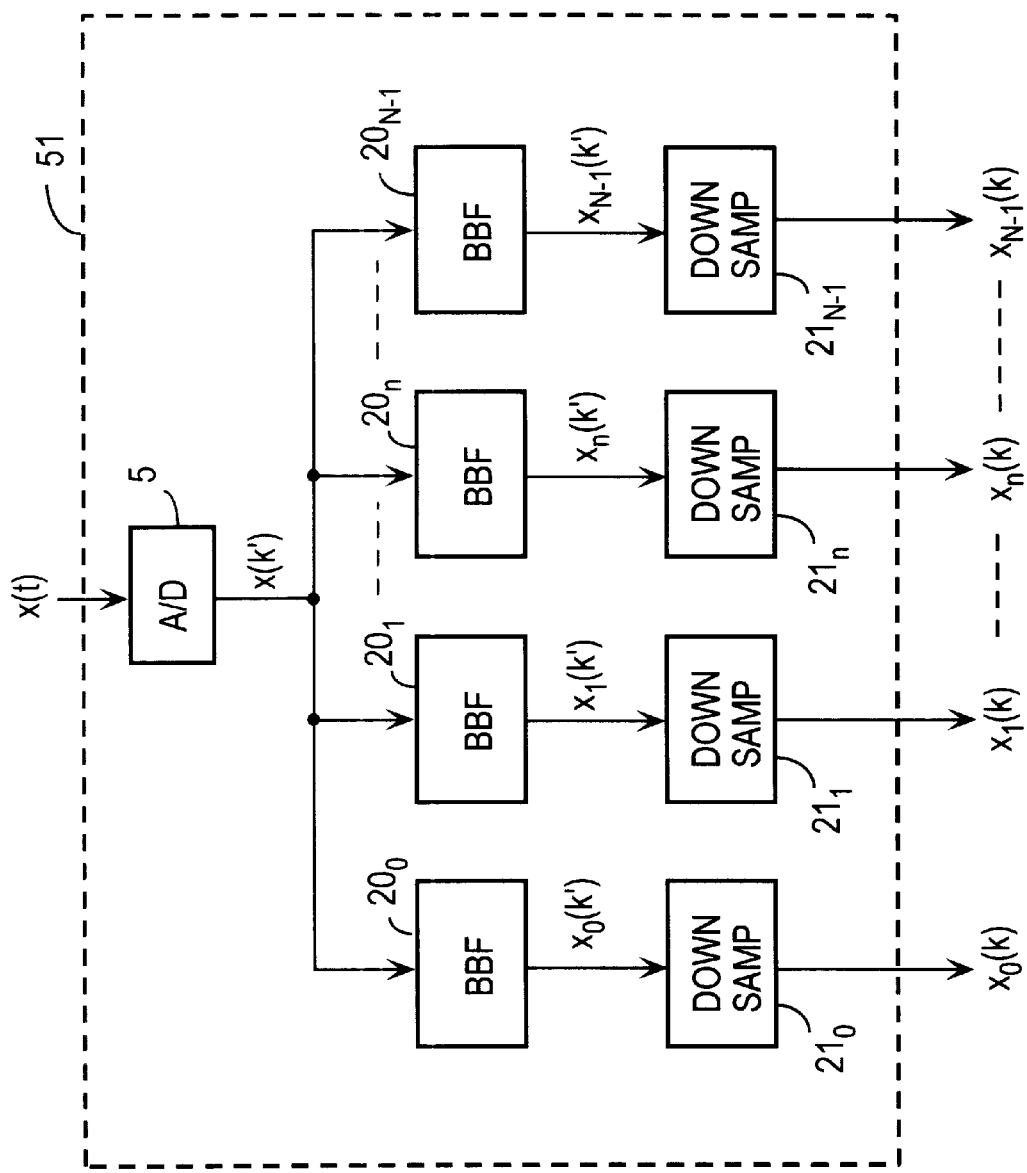
FIG. 8 is block diagram illustrating an example of the functional configuration of the inside of a subband analysis part 51 in FIG. 7.

FIG. 8 illustrates in block form the functional configuration of the subband analysis part 51, wherein the received signal x(t) is converted by an A/D converter 5 into samples, which are each band-limited by a band-pass filter $20_n$. Such a band-limited real-number signal $x_n(k')$ could be produced also by replacing the band-pass filter $20_n$ with an SSB (Single Side Band) scheme described in Crochiere and Rabiner, "Multirate Digital Signal Processing", Englewood Cliffs, NJ:Prentice-Hall, pp. 52–56, 1983. The band-limited real-number signal $x_n(k')$ is down sampled with a down sampling ratio R to obtain a real-number signal $x_n(k)$. The signal $x_n(k)$ in each divided subband will hereinafter be referred to as a subband received signal. The subband analysis part 52 for the echo y(k') is identical in construction with the subband analysis part 51 of FIG. 8, and the echo $y_n(k)$ divided by the subband analysis part 52 into each subband will hereinafter be referred to as a subband echo.

With the subband scheme, each subband width is narrow and the time interval between adjacent samples is increased by decimation, so that information about the variation in the cross-correlation between received signals is emphasized. This increases the speed of convergence to the true value.

Figure 4:
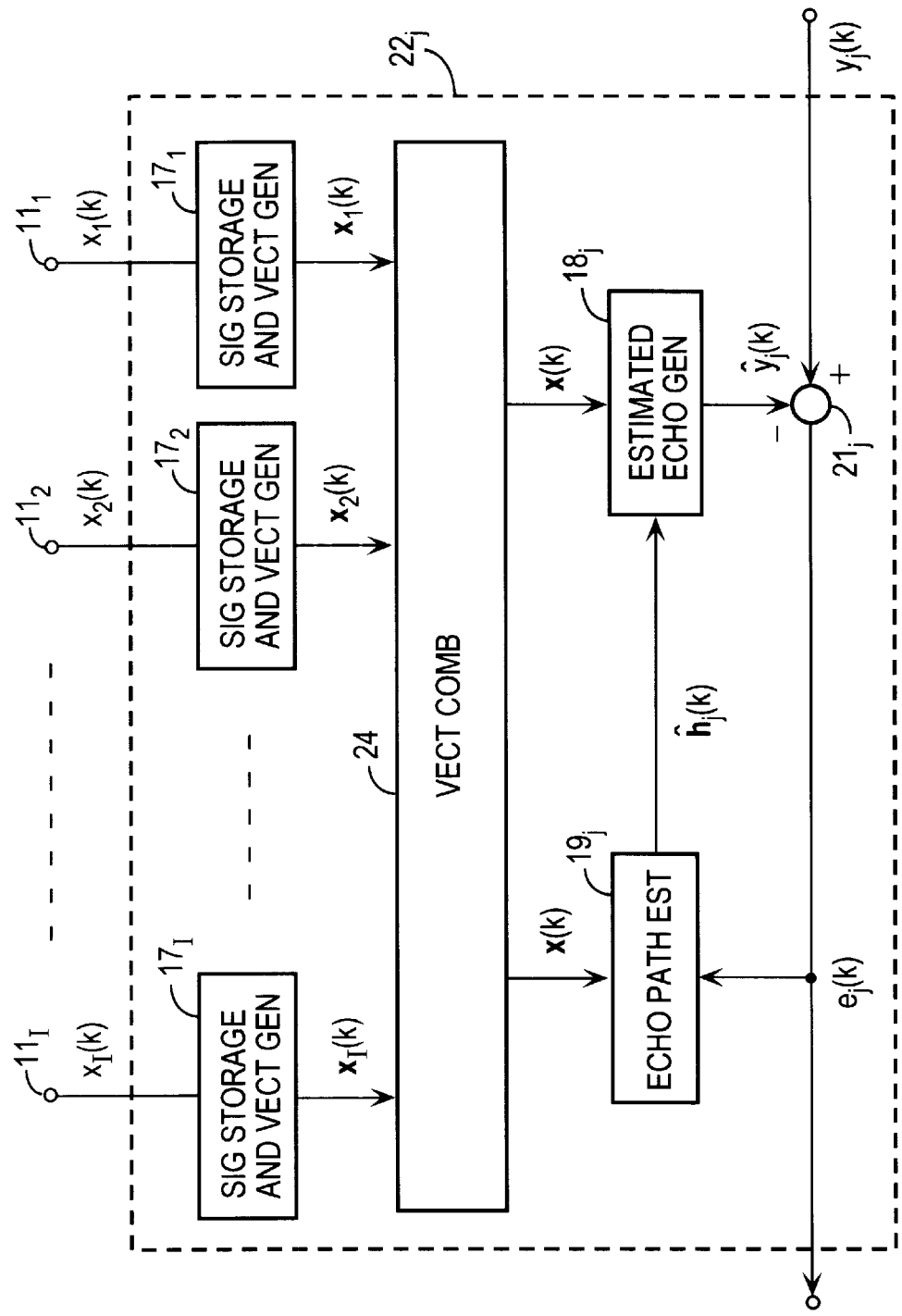
FIG. 4 is a block diagram illustrating the functional configuration of the conventional multichannel echo canceller.
Figure 9:
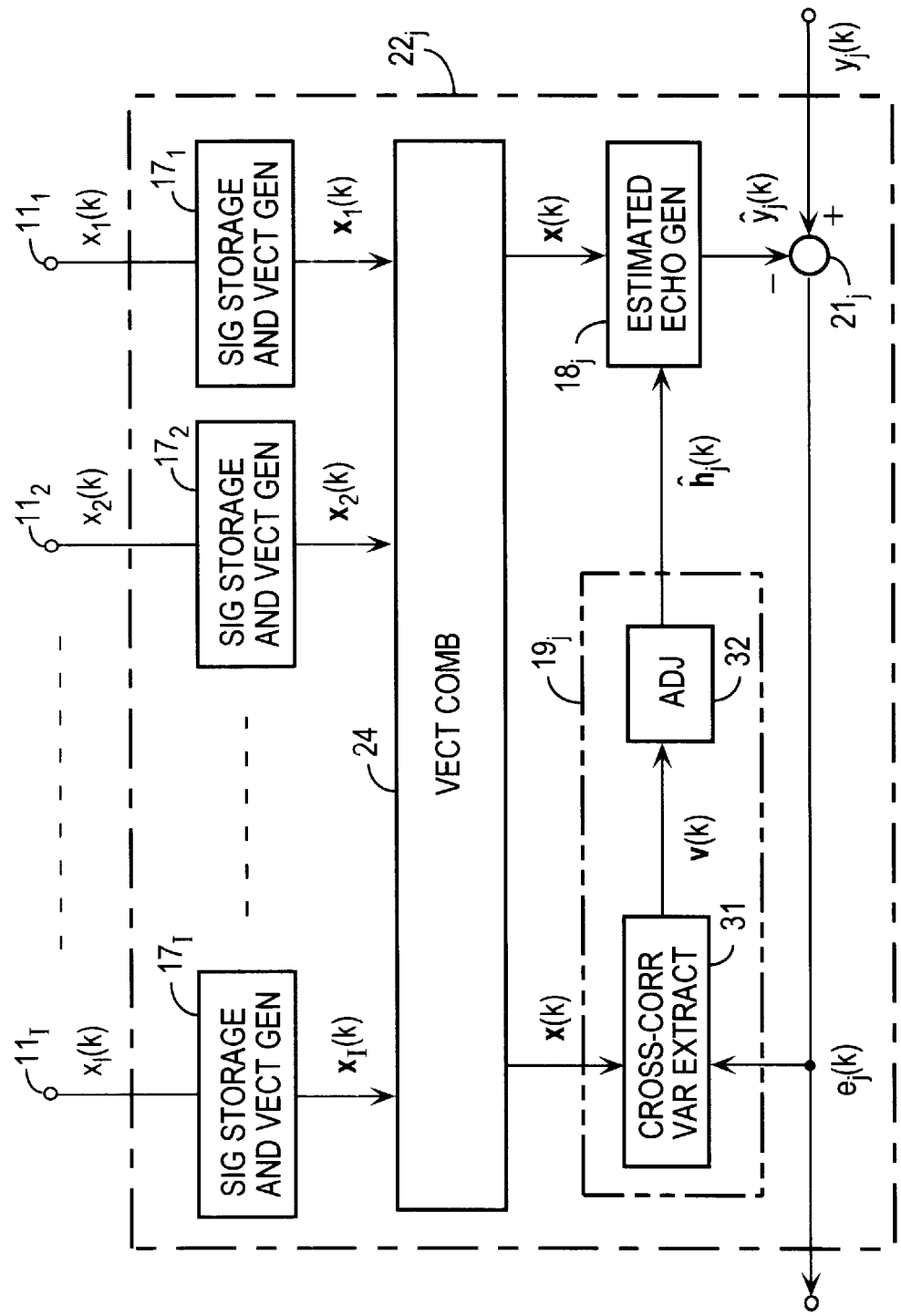
FIG. 9 is a block diagram illustrating the configuration of the multichannel echo canceller employing a first method according to the present invention.

Furthermore, the second method extracts and utilizes the information about the variation in the cross-correlation between received signals of respective channels as referred to previously. In FIG. 9 there is illustrated an echo canceller $22_j$ in each subband. The parts corresponding to those in FIG. 4 are identified by the same reference numerals. According to the present invention, the echo cancellers $22_1$ to $22_J$ each have a cross-correlation variation component extracting part 31. The cross-correlation variation component extracting part 31 stores the combined received signal vector x(k) and the echo cancellation error signal $e_j(k)$ and generates an auto-correlation removing vector, that is, an adjustment vector v(k). When the combined received signal vector x(k) is a combined vector of multichannel signal vectors of high cross-correlation, the vector v(k) is provided as a vector which emphasizes the variation component of the cross-correlation between the respective channel, eliminating an unchanged component of the cross-correlation. An adjustment part 32 uses the adjustment vector v(k) to update the current combined estimated echo path vector $\hat{h}_{j(k)}$ and outputs it to the estimated echo path 18$_j$.

In the configuration of the conventional apparatus, the received signal vectors of the respective channels are combined. On this account, the cross-correlation between the received signals of the respective channels appears or shows up in the auto-correlation that is the correlation between the current and previous combined received signal vectors. Hence, it is possible to remove the non-variation component of the cross-correlation and extract the cross-correlation variation component for the received signal of each channel by reducing the auto-correlation of the combined received signal vector, that is, by removing the auto-correlation of the combined received signal vector. To perform this, there has been proposed a method of using the projection algorithm, RLS algorithm, or linear prediction in a one-channel echo canceller. Of the proposed schemes, the linear prediction scheme linearly predicts a speech signal and used its linear prediction coefficient to remove the auto-correlation of the speech signal. The RLS algorithm can be regarded as a specific example of the projection algorithm. Then, the scheme of removing the auto-correlation of the combined received signal vector by the projection algorithm will be described below as the most practical example.

Figure 10:
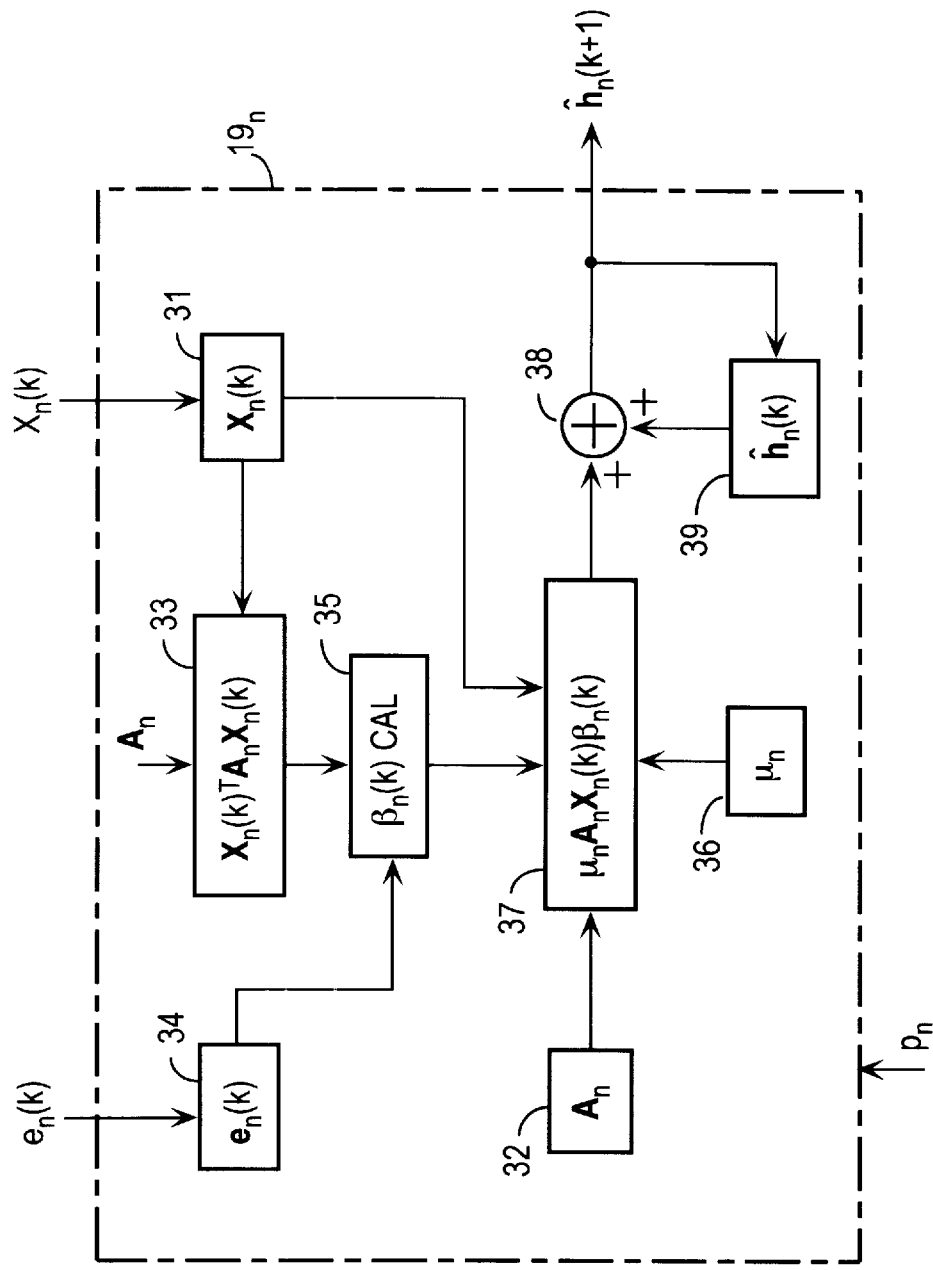
FIG. 10 is a block diagram illustrating an example of the functional configuration of the inside of an n-th subband estimation part $19_n$ in FIG. 7.

FIG. 10 illustrates in block form an example of the functional configuration of an n-th subband estimation part 19$_n$ assumed to use a $p_n$-order ESP algorithm (the projection algorithm when A=I, I being a unit matrix).

Upon each application thereto of the subband received signal $x_n(k)$, a received signal storage part 31 generates $p_n$ subband signal vectors each consisting of successive $L_n$ subband received signals as follows:

$$x_n(k)=[x_n(k),x_n(k-1),\ldots,x_n(k-L_n+1)]^T$$

$$x_n(k-1)=[x_n(k-1),x_n(k-2),\ldots,x_n(k-L_n)]^T$$

$$x_n(k-p_n+1)=[x_n(k-p_n+1),x_n(k-p_n),\ldots,x_n(k-p_n-L_n+2)]^T$$

Further, the received signal storage part 31 creates from these vectors the following subband received signal matrix.

$$X_n(k)=[x_n(k),x_n(k-1),\ldots,x_n(k-p_n+1)]$$

where $L_n$ is the number of taps of the FIR filter forming the estimated echo path 18$_n$ in the n-th subband. Incidentally, $x_n(k), x_n(k-1), \ldots$ in the above equations are combined vectors given by Eq. (22). That is, the received signal storage part 31 is supplied with $X_n(k)$ that is a vector combination of the subband received signals $x_n(k)$ of first to I-th channels.

It is assumed here that the $p_{kn}$-order projection or ESP algorithm is used in the n-th subband. In a step size matrix storage part 32 there is stored a first step size matrix $A_n=\text{diag}[\alpha_{n1},\alpha_{n2},\ldots,\alpha_{nLn}]$. The step size matrix $A_n$ is weighted using the impulse response variation characteristic in the corresponding subband.

In an ordinary room, the impulse response variation in the n-th subband is expressed as an exponential function using an attenuation ratio $\gamma_n$. An auto-correlation calculating part 33 calculates an auto-correlation matrix $X_n(k)^T A_n X_n(k)$ of the subband received signal matrix $X_n(k)$ weighted with the first step size matrix $A_n$. The thus calculated auto-correlation matrix and the residual or error $e_n(k)$ are fed to a $\beta_n(k)$ calculating part 35 to solve the following simultaneous linear equation with $P_n$ unknowns to obtain a constant $\beta_n(k)$.

$$[X_n(k)^T A_n X_n(k)]\beta_n(k)=e_n(k) \tag{33}$$

To avoid instability in the inverse matrix operation, a small positive constant $\delta_n$ is used as follows:

$$[X_n(k)^T A_n X_n(k)+\delta_n I]\beta_n(k)=e_n(k) \tag{33}'$$

where I represents a unit matrix. A second step size $\mu_n$ from a step size storage part 36, the first step size matrix $A_n$, the received signal matrix $X_n(k)$ and the constant $\beta_n(k)$ are provided to an adjusted vector calculating part 37 to calculate the following adjusted vector.

$$\mu_n A_n X_n(k)\beta_n(k) \tag{34}$$

The adjusted vector is fed to an adder 38, wherein it is added to a coefficient vector $\hat{h}_n(k)$ consisting of $L_n$ elements from a tap coefficient storage part 39 to obtain an adjusted coefficient vector (impulse response) $\hat{h}_n(k+1)$. The calculated result $\hat{h}_n(k+1)$ is provided to the estimated echo path 18$_n$ and, at the same time, it is fed to the tap coefficient storage part 39 to update the value stored therein.

By repeating the above-described operation upon each application of the subband received signal $x_n(k)$, the estimated echo path 18$_n$ is iteratively updated following equation (35) and the impulse response $\hat{h}_n(k)$ of the estimated echo path 18$_n$ approaches the impulse response $h_n(k)$ of the true echo path 15 in the n-th subband.

$$\hat{h}_n(k+1)=\hat{h}_n(k)+\mu_n A_n X_n(k)\beta_n(k) \tag{35}$$

where $A_n=\text{diag}[\alpha_{n1},\alpha_{n2},\ldots,\alpha_{nLn}]$
: step size matrix in the n-th subband $\alpha_{n1}=\alpha_{n o\gamma n}^{1-1}$ (1=1, 2, ..., $L_n$)

$\gamma_n$: attenuation ratio of the impulse response variation in the n-th subband $L_v$: number of taps in the n-th subband $\hat{h}_n(k)=[\hat{h}_{n1}(k),\hat{h}_{n2}(k),\ldots,\hat{h}_{nLn}(k)]^T$
: estimated echo path vector in the n-th subband $$e_n(k)=[e_n(k),(1-\mu_n)e_n(k-1),\ldots,(1-\mu_n)^{p_n-1}e_n(k-p_n+1)]^T \tag{36}$$

$e_n(k)=y_n(k)-\hat{h}_n(k)^T X_n(k)$
: estimation error in the n-th subband $$X_n(k)=[x_n(k),x_n(k-1),\ldots,x_n(k-p_n+1)] \tag{37}$$

$$x_n(k)=[x_n(k),x_n(k-1),\ldots,X_n(k-L_n+1)]^T \tag{38}$$

: received signal vector in the n-th subband $$\beta_n(k)=[\beta_{n1},\beta_{n2},\ldots,\beta_{npn}]^T \tag{39}$$

$\mu_n$: second step size (scalar quantity) in the n-th subband

What is worthy of mention here is that the variation in the cross-correlation differs for each subband and is small in lower frequency bands and large in higher frequency bands. In view of this, the convergence speed could be made uniform as a whole with a small computational load by increasing the projection order to increase the convergence speed in the subbands in which the cross-correlation undergoes small variations and by decreasing the projection order in the subbands in which the cross-correlation undergoes great variations.

It must also be noted here that the number of taps $L_n$ in each subband is reduced by down sampling. In the ESP algorithm the relationship between the order p and the convergence characteristic is affected by the number of taps L. That is, when the number of taps L is large, the order p needs to be set large for complete saturation of the convergence speed, whereas when the number of taps L is small, complete saturation of the convergence speed can be achieved with a small order p. For example, when the number of taps L is about 1000, it is necessary to set the order p at 50- to 100-th order or so; in contrast to this, when the number of taps $L_n$ is reduced to around 64 by the subband analysis and the down sampling, about 16-th to 32-nd order is enough.

With the use of the ESP algorithm in the subband multi-channel echo canceller, the effect of emphasizing the cross-correlation variation by the subband scheme is multiplied by the emphasizing effect of the ESP algorithm since the number of taps is decreased by decimation in the subband scheme—this produces an unexpected effect, achieving a very high convergence speed with a low projection order. Moreover, by setting the projection order at an optimum value in each subband, the maximum effect could be produced with a small computational load.

Figure 11:
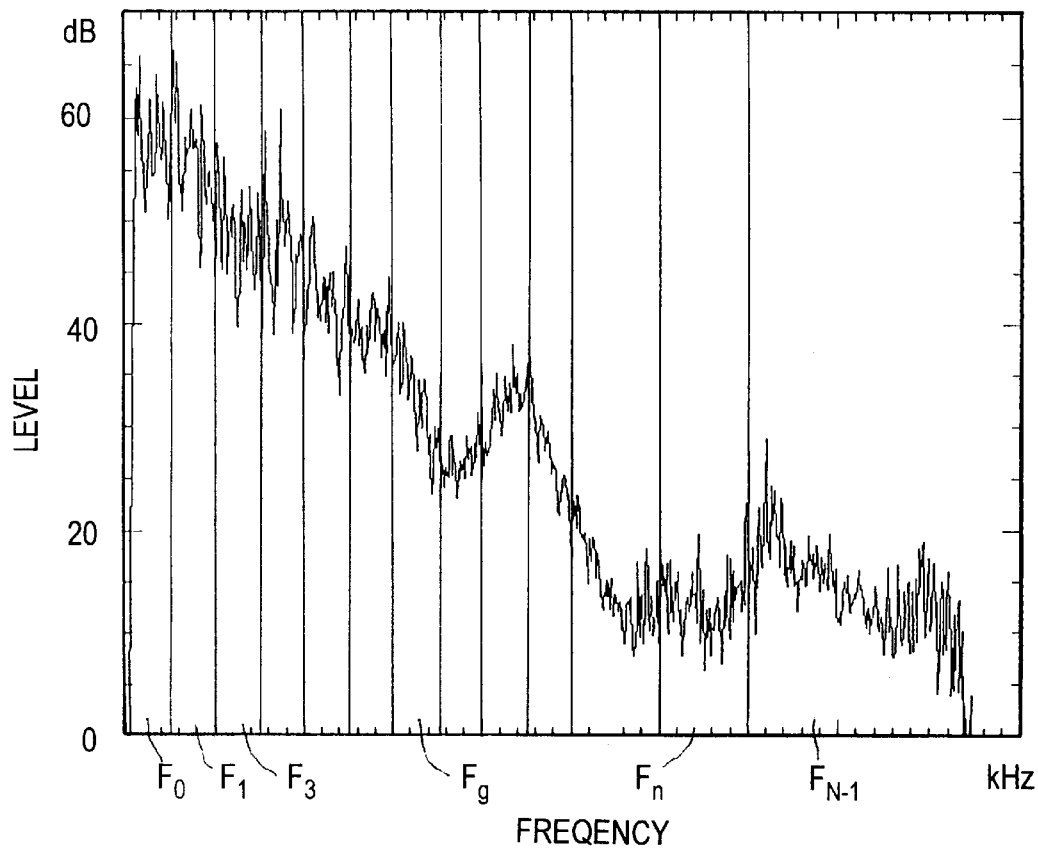
FIG. 11 is a graph showing an example of the frequency spectrum of a speech signal.

In the example of the frequency spectrum of ordinary speech shown in FIG. 11, when the received signal is divided into a plurality of subbands $F_0, F_1, \ldots, F_{N-1}$, the spectral envelope differs with the subbands. As a result, the order of the ESP algorithm necessary for saturation of the convergence speed in each subband also differs. For instance, the subband $F_g$ in FIG. 11 calls for a high-order ESP algorithm since the spectrum varies complicatedly, but in the subband $F_n$ the required order of the ESP algorithm is low since the spectrum is appreciably flat.

Figure 12:
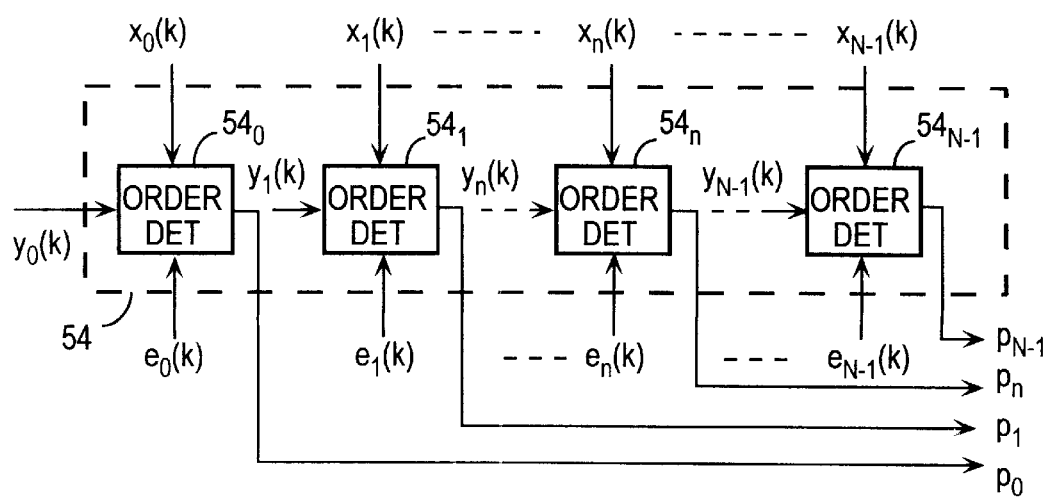
FIG. 12 is a block diagram illustrating an example of the configuration of an order determination control part 54 for use in the application of a first or second order determining scheme in FIG. 7.

Hence, the present invention determines the order suited to each subband, that is, the lowest possible order that achieves the fastest possible convergence. To this end, an order determination control part 54 is provided as shown in FIG. 7. In FIG. 12 there is illustrated an example of its functional configuration. The order $p_n$ of the ESP algorithm in each subband is determined by the order determination control part 54 as described below.

Figure 13:
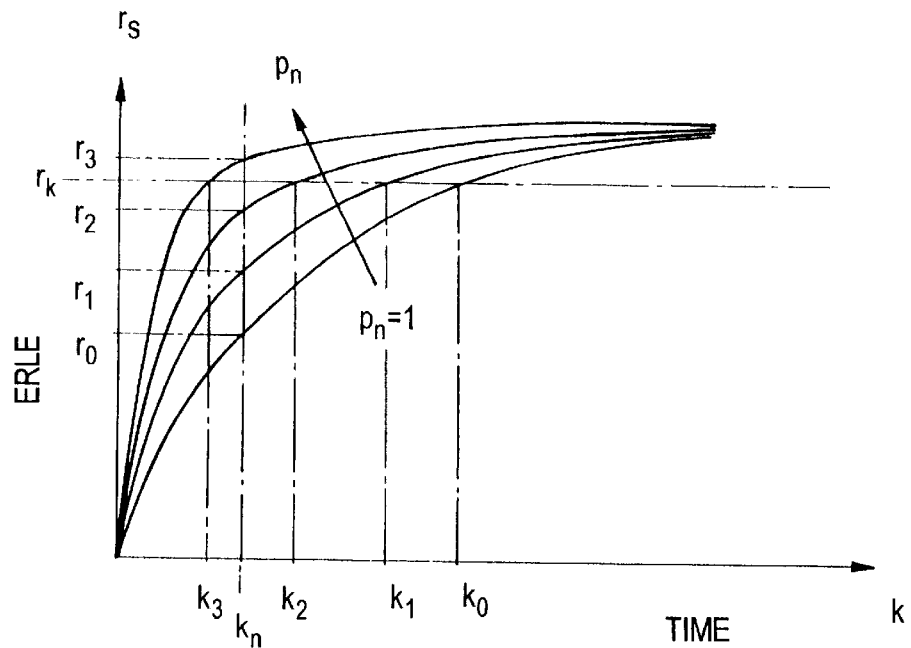
FIG. 13 is a graph schematically showing variations in the convergence speed of an echo return loss enhancement with an increase in the projection order.

Scheme 1: Observe how convergence proceeds from the subband echo $y_n$ and the residual signal $e_n$ while changing the order $p_n$. The order determination control part 54 in this case is made up of order determining parts $54_0$ to $54_{N-1}$ each provided in one of the subbands as shown in FIG. 12. By setting the order $p_n=1$, for example, in each subband and calculating the ratio (echo return loss enhancement:ERLE) $r_{pn}=20 \log_{10}(y_n/e_n)$ between the subband echo $y_n$ and the residual signal $e_n$ that is obtained upon each input of the subband received signal $x_n(k)$, a convergence curve of the echo return loss enhancement ERLE such as schematically shown in FIG. 13 is obtained. Similar ERLE convergence curves are obtained also when the order $p_n$ becomes higher. Thus, the scheme 1 starts the echo cancellation by the $p_n$-th order ESP algorithm at time k=0, and the order determining part $54_n$ calculates the ERLE value $r_s$ at a predetermined time $k=k_k$ for every one of a series of orders $p_n=p_s$, where s=1,2, . . . , which monotonously increase so that, for example, $p_{s+1}=p_s+1$, where $p_1=1$. Then, upon each calculation of the ERLE value $r_s$ for every order $p_n=p_s$, the order determining part $54_n$ calculates the ratio, $R=(r_s-r_{s-1})/(p_s-p_{s-1})$ of the difference between the current ERLE value $r_s$ and that $r_{s-1}$ in the echo cancellation by the projection algorithm of the current and immediately preceding orders $p_n=p_s$ and $p_n=p_{s-1}$ to the difference $(p_s-p_{s-1})$ between the current and the immediately preceding orders. Then the order determining part $54_n$ determines the order $p_n=p_s$ in which the calculated value begins to be smaller than a predetermined threshold value $R_{th}$.

Figure 14:
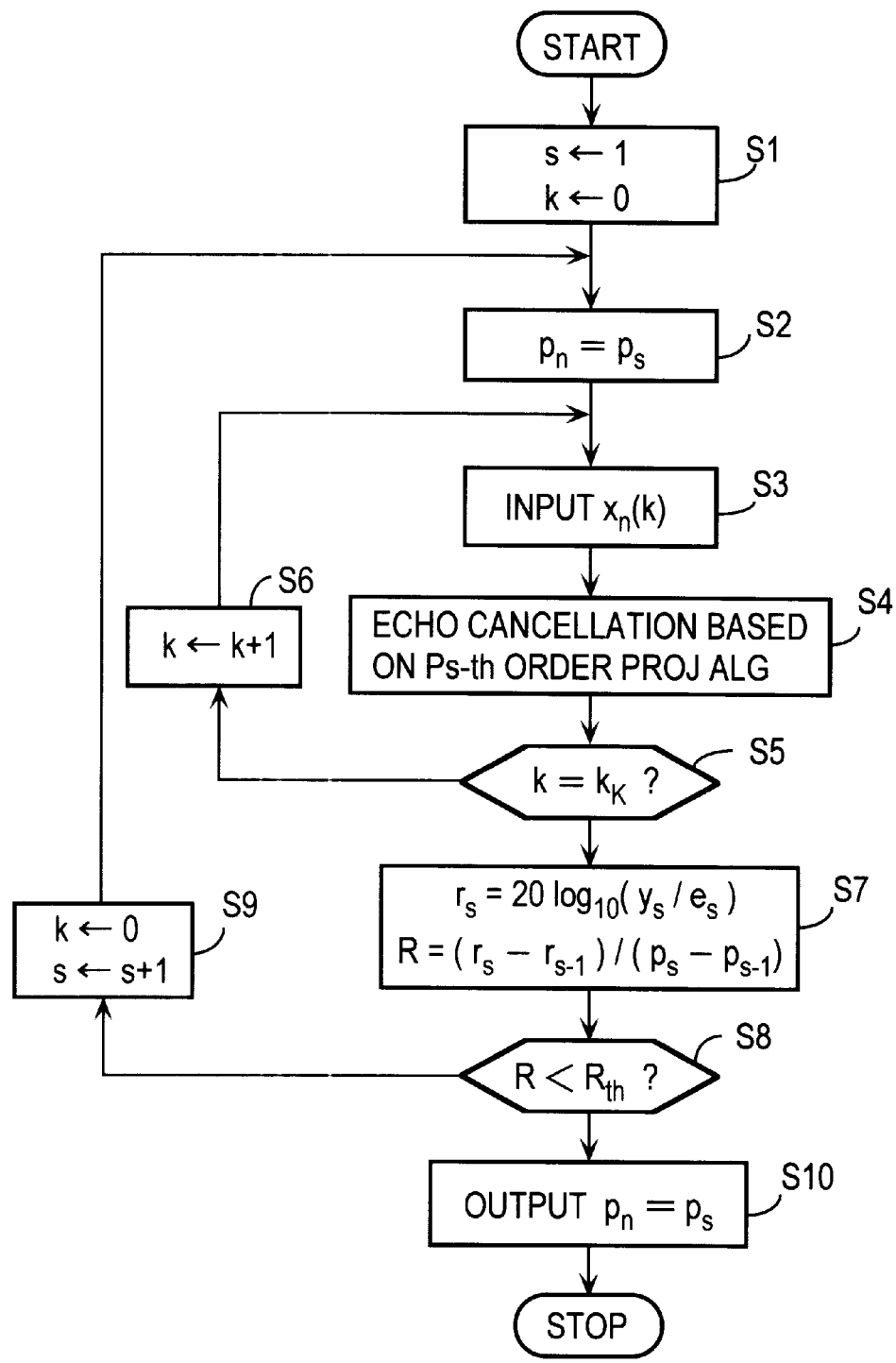
FIG. 14 is a flowchart showing the order determining procedure by a first order determining scheme.

FIG. 14 shows a concrete example of the order determining procedure by the first order determining scheme. The order determining part $54_n$ initially sets integral parameters s and k to 1 and 0, respectively, in step S1 and, in step S2, sets the order $p_n=p_s$ and provides it to the estimation part $19_n$ in the corresponding subband. When the subband received signal $x_n(k)$ is input in step S3, the procedure proceeds to step S4, wherein the received signal vector $x_n(k)$ is provided to the estimated echo path $18_n$ to obtain therefrom the echo replica $\hat{y}_n(k)=\hat{h}_n(k)^T X_n(k)$ and the estimation error $e_n(k)=y_n(k)-\hat{y}_n(k)$ between the echo replica $\hat{y}_n(k)$ and the subband echo $\hat{y}_n(k)$ is calculated by the subtractor $21_n$. Further, the estimation part $19_n$ estimates the estimated echo path vector $\hat{h}_n(k+1)$ by the $(p_n=p_s)$-th ESP algorithm, using $p_n+L_n$ subband received signals $x_n(k), x_n(k-1), \ldots, x_n(k-p_n-L_n+2)$ and $p_n$ estimation errors $e_n(k), e_n(k-1), \ldots, e_n(k-p_n+1)$ which start at the latest time k. The thus estimated coefficient $\hat{h}_n(k+1)$ is set in the corresponding estimated echo path $18_n$. That is, upon each input of the subband received signal $x_n(k)$, the echo cancellation based on the $(p_n=p_s)$-th order ESP algorithm is carried out, in step S4, by the parts associated with the n-th subband in the echo canceler shown in FIG. 7.

In step S5 a check is made to see if the time k has reached a predetermined time $k_k$; if not, the value k is incremented by one in step S6 and the procedure goes back to step S3, and the echo cancellation is carried out by the $p_n$-th order ESP algorithm in steps S3 and S4. The echo cancellation is repeated until the time k reaches $k_k$, and at the time $k=k_k$, the procedure proceeds to step S7, wherein the order determining part $54_n$ calculates the ERLE value $r_s=20 \log_{10}(y_s/e_s)$ from the subband echo $y_s=y_n(k_k)$ and the estimation error $e_s=e_n(k_k)$ at that point in time $k=k_k$ and calculates the rate, $R=(r_s-r_{s-1})/(p_s-p_{s-1})$, of an increase in the ERLE value to an increase in the order $(p_s-p_{s-1})$, that is, the degree of saturation of the convergence speed. In this case, when s=1, R=∞. Then, in step S8 a check is made to see if the degree of saturation of the convergence speed R is smaller than the predetermined value $R_{th}$; if not (the convergence speed has not saturated), the parameter k is reset to zero and the parameter s is incremented by one in step S9, after which the above-described processing of steps S3 to S8 is carried out again by the $(p_n=p_s)$-th ESP algorithm. When $R<R_{th}$ is satisfied in step S8, it is decided that the convergence speed has been fully saturated, and in step S10 the order $p_s$ at that time is determined to be the order $p_n$ of the ESP algorithm in the n-th subband, which is output to the corresponding estimation part $19_n$.

Figure 15:
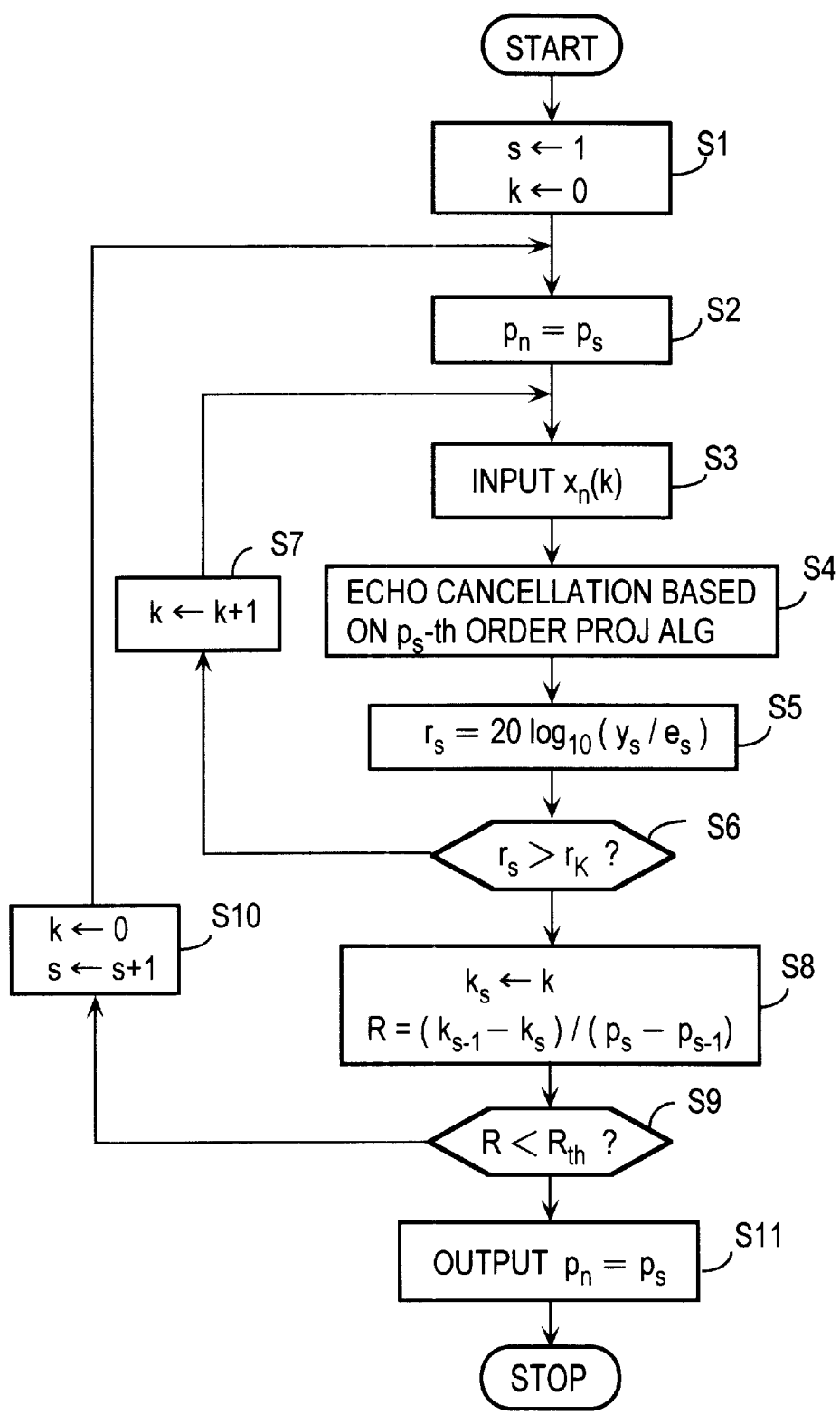
FIG. 15 is a flowchart showing the order determining procedure by a second order determining scheme.

Scheme 2: A threshold value $r_k$ of a predetermined ratio, for example, 30 dB, is determined with respect to the ERLR saturation value through utilization of the fact that the time for reaching the fixed ERLE value $r_k$ decreases as the order $p_n$ becomes higher in FIG. 13. For each of the monotonously increasing orders $p_n=p_s$, where s=1, 2, . . . , the echo cancellation by the $(p_n=p_s)$-th order ESP algorithm is started at the time k=0, and upon each input of the subband signal $x_n(k)$, the calculation of the ERLE value $r_s=20 \log_{10}(y_s/e_s)$ is repeated in the order determining part $54_n$ in FIG. 12, by which is detected the time $k_s$ when the ERLE value $r_s$ becomes smaller than the threshold value $r_k$. This is followed by determining the order $p_n=p_s$ in which the ratio, $R=(k_{s-1}-k_s)/(p_s-p_{s-1})$, of the difference between points in time $k_{s-1}$ and $k_s$, at which $r_s>r_k$, detected in the echo cancellation by the projection algorithms of the immediately preceding and current orders $P_{s-1}$ and $p_n=p_s$, respectively, to the difference between the preceding and current orders, $(p_s-p_{s-1})$, becomes smaller than the predetermined threshold value $R_{th}$. FIG. 15 shows the order determining procedure in this instance.

As is the case with FIG. 14, in step S1 the integral parameters s and k are initially set at 1 and 0, respectively, then in step S2 the order $p_n$ is set at $p_s$, and upon each input of the subband received signal $x_n(k)$ in step S3, the echo cancellation by the $p_s$-th order ESP algorithm is carried out in step S4. With the second scheme, in step S5 the order determining part $54_n$ calculates ERLE value $r_s=20\log_{10}(y_s/e_s)$ from the subband echo $y_s=y_n(k)$ and the estimation error $e_s=e_n(k)$ and in step S6 a check is made to determine if the ERLE value $r_s$ is larger than the predetermined value $r_k$; if not, the parameter k is incremented by one, then the procedure returns to step S3, and steps S4, S5 and S6 are repeated again. When $r_s>r_k$, it is decided in step S8 that the current time k is the time $k_s$ when the ERLE value $r_s$ has reached the predetermined value $r_k$ in the echo cancellation by the projection algorithm of the order $p_n=p_s$. Then the ratio of the time difference $(k_{s-1}-k_s)$ between the current time $k_s$ and the time $k_{s-1}$, at which the value $r_k$ has been reached in the case of the order $p_n=p_{s-1}$, to the difference $(p_s p_{s-1})$ between the current and the immediately preceding order of the projection algorithm for echo cancellation, that is, the degree of saturation of the convergence speed, is calculated as $R=(k_{s-1}-k_s)/(p_s-p_{s-1})$. In this instance, when s=1, R=∞. This followed by step S9, wherein a check is made to determine if the above-mentioned value R has become smaller than the predetermined threshold value $R_{th}$; if not the parameter k is reset to zero and the parameter s is incremented by one in step S10, then the procedure returns to step S2, followed by repeating the steps S2 to S9. When it is decided in step S9 that $R<R_{th}$, it is determined in step S11 that the order $p_n=p_s$ at that time is the order $p_n$ of the ESP algorithm in the n-th subband, and the thus determined order is set in the corresponding estimation part $19_n$.

In either case, the monotone increasing order $p_n=p_s$ (where s=1,2, . . . ) of the ESP algorithm in the n-th subband may be set at, for instance, $p_{s+i}=p_s+d$ (where d is a fixed integer equal to or greater than 1), or $p_{s+1}=p_s+sd$, or $p_{s+1}=cp_s$ (where c is a fixed integer equal to or greater than 2). It is also possible to use any monotone increasing functions as long as they are gradually increasing functions.

Figure 16:
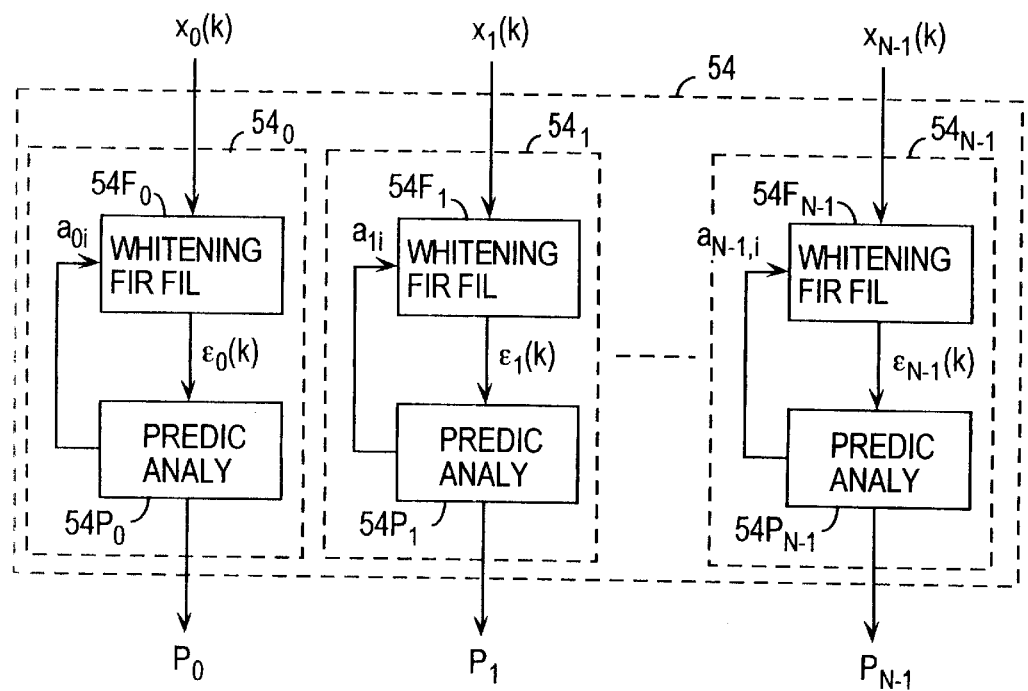
FIG. 16 is a block diagram illustrating an example of the configuration of the order determination control part 54 for use in the application of a third order determining scheme.

Scheme 3: The $p_n$-th order ESP algorithm is equivalent to the application of the input signal $x_n$ to a $(p_n-1)$-th whitening FIR filter (that is, a linear predictive coding filter with $p_n$ taps). Then, each order determining part $54_n$ (n=0,1, . . . ,N-1) of the order determination control part 54 is formed by a $(p_n-1)$-th whitening FIR filter $54F_n$ and a prediction analysis part $54P_n$ as shown in FIG. 16. For a series of $L_n$ subband received signals $x_n(k-j)$ (where j=0, 1, . . . ,$L_n-1$) that are input into the whitening FIR filter $54F_n$ for each subband, the prediction analysis part $54P_n$ calculates prediction coefficients $a_{ni}$ (where i=1,2, . . . ,$p_n-1$) that minimize squared sum of $L_n$ prediction errors $\epsilon_n(k-j)$ (where j=0,1, . . . , $L_n-1$), given by the following equation (40).

$$\sum_{j=0}^{L_k-1} \epsilon_n^2(k-j) = \sum_{j=0}^{L_k-1}\left\{x_n(k-j) - \sum_{i=1}^{pk-1} a_{ni}x_n(k-j-i)\right\}^2 \quad (40)$$

where the first Σ on each of the left- and right-hand sides represents the summation from j=0 to $L_n$ and the second Σ on the right-hand side the summation from i=1 to $p_n$. (This is commonly called a linear prediction analysis, which is well-known in the art.) Letting the L, prediction errors $\epsilon_n(k-j)$ (where j=0,1, . . . ,$L_n-1$), which are obtained by setting the prediction coefficients $a_{ni}$ in the filter $54F_n$, be represented as vectors $$\epsilon_n(k)=[\epsilon_n(k), \epsilon_n(k-1), \ldots, \epsilon_n(k-L_n+1)]^T \quad (41)$$

the prediction error vectors $\epsilon_n(k)$ can be expressed as follows:

$$\epsilon_n(k)=X_n(k)a_n(k) \quad (42)$$

where $$a_n(k)=[1, -a_{n1}, -a_{n2}, \ldots, -a_{npn-1}]^T \quad (43)$$

Eq. (42) represents the whitening of the subband received signal matrix $X_n(k)$, and the following covariance matrix of the prediction error vectors $\epsilon_n(k)$ obtained by this whitening has $L_n$ eigen values $\lambda_{n0}, \lambda_{n1}, \ldots, \lambda_{nLn-1}$.

$$Q_n(k)=\epsilon_n(k)\epsilon_n(k)^T \quad (44)$$

The ratio $C_s$ between the maximum and minimum ones, $\lambda_{max}$ and $\lambda_{min}$, of these eigen values represents the degree of whitening of the subband signal matrix $X_n(k)$. The smaller the value of this ratio $C_s$, the higher the degree of whitening. When complete whitening is achieved, the ratio $C_s=1$. Then, the ratio $C_s$ (where s=1,2, . . . ) is calculated when the projection order $p_n=p_s$ (where s=1,2, . . . ) is raised to higher value one after another, and the first order $p_s$ at the time when the ratio $C_s$ becomes smaller than a predetermined threshold value $C_{th}$ or when the ratio variation $\Delta C_s=C_{s-1}-C_s$ becomes smaller than a predetermined threshold value $\Delta C_{th}$ is determined to be the order $p_n$ of the projection in the n-th subband.

Figure 17:
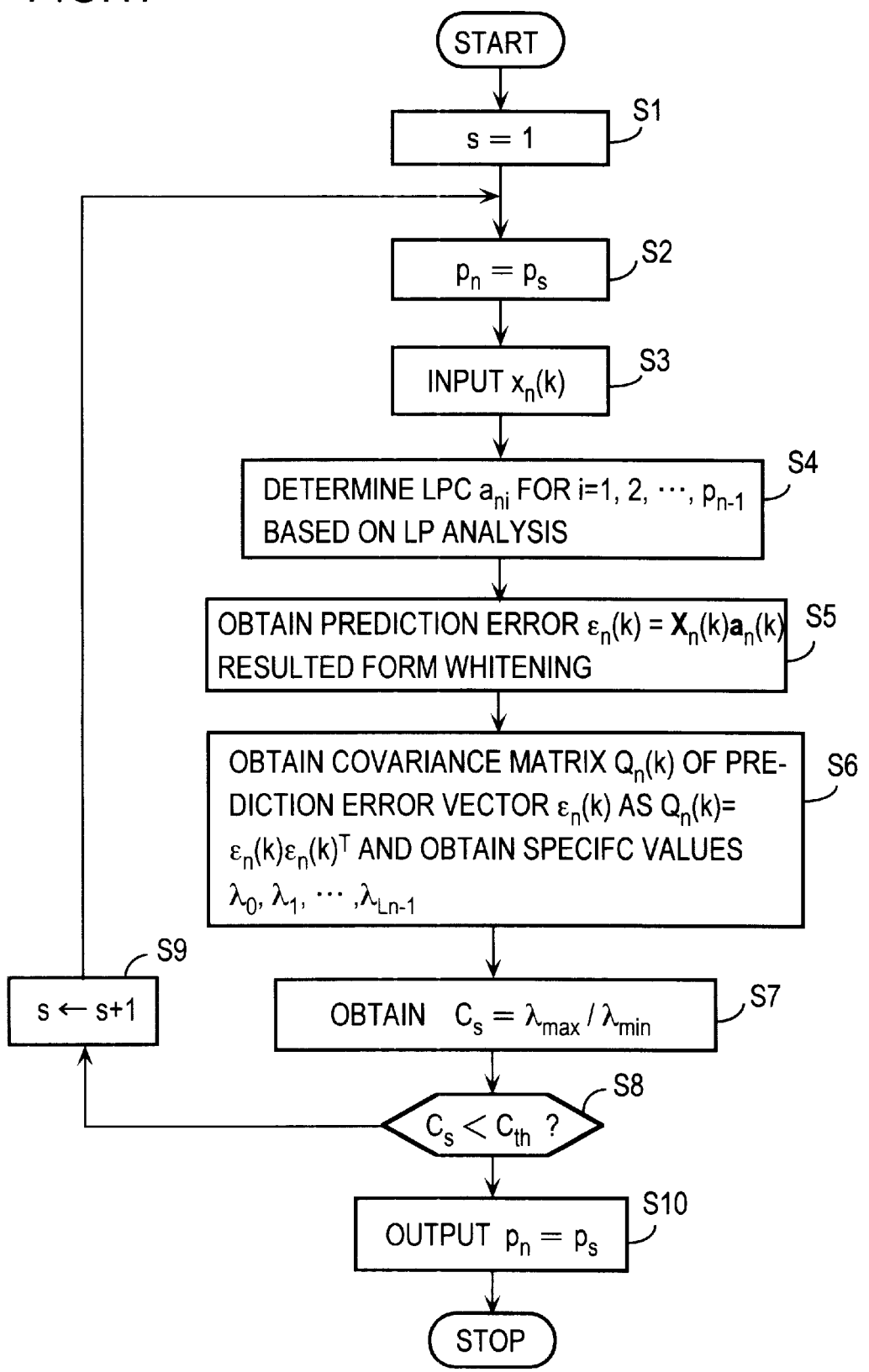
FIG. 17 is a flowchart showing the order determining procedure by the third order determining scheme.

FIG. 17 illustrates the procedure for determining the order $p_n$ of the ESP algorithm in the n-th subband through the use of the third scheme. In step Si the integral parameter s is set at 1, then in step S2 the order $p_n$ is set at $p_s$, and in step S3 the required number of subband received signals $x_n(k)$, $x_n(k-1)$, . . . , $x_n(k-p_n-L_n+2)$ for the constitution of the received signal matrix $X_n(k)$ is input. Next, in step S4 the input subband received signals are subjected to the linear prediction coding (LPC) analysis by Eq. (40) to calculate the predictive coefficients $a_{ni}$ (where i=1,2, . . . ,$p_n-1$), and in step S5 the subband received signals are whitened by Eq. (42) to calculate the estimation error vectors $\epsilon_n(k)$. Then, in step S6 the covariance matrix $Q_n(k)$ of the estimation error vectors $\epsilon_n(k)$ expressed by Eq. (44) is calculated and the $L_n$ eigen values $\lambda_0, \lambda_1, \ldots, \lambda_{Ln-1}$ of the covariance matrix $Q_n(k)$ are calculated. In step S7 the ratio $C_s=\lambda_{max}/\lambda_{min}$ in between the maximum and minimum values of the eigen values is calculated and in step S8 a check is made to see if the ratio $C_s$ is smaller than the threshold value $C_{th}$. If not, the parameter s is incremented by one in step S9, after which steps S2 to S8 are repeated again. When it is determined in step S8 that the ratio $C_s$ is smaller than the threshold value $C_{th}$, it is determined in step S10 that the order $p_s$ is the order $p_n$ of the ESP algorithm in the n-th subband, and the order $p_s=p_n$ is output.

While in the above the ratio $C_s$ has been described to be compared with the threshold value $C_{th}$ in step S8, it is also possible to employ a procedure wherein the difference, $\Delta C_s=C_{s-1}-C_s$, between the ratios $C_{s-1}$ and $C_s$ obtained with the immediately preceding and current orders $p_{s-1}$ and $p_s$, respectively, is calculated in step S7, then the difference $\Delta C_s$ is compared with the predetermined threshold value $\Delta C_{th}$ in step S8 and, when the difference $\Delta C_s$ becomes smaller than the threshold value $\Delta C_{th}$, the order $p_n=p_s$ at that time is output in step S10. As the function for monotonously increasing the order $p_n=p_s$, the same monotone increasing functions as those described previously with respect to the first and second order determining schemes can be used.

It is possible to determine the orders $p_n$ of the ESP algorithm for various speech sounds by any one of the order determining schemes 1 to 3 and preset the orders in the estimation part $19_n$, for example, prior to shipment from factory. Incidentally, it is also possible to determine the orders $p_n$ of the ESP algorithm with respect to various speech sounds, various numbers N of subbands and the number of taps $L_n$ by any one of the schemes 1 to 3 and prestore a standard value of the order $p_n$ in an ROM so that a user sets the order $p_n$ in the estimation part $19_n$ from the ROM in correspondence with a desired number N of subbands of the echo canceler.

When using the DSP to construct the echo canceler, the order of the ESP algorithm cannot be raised up to the level of complete saturation of the convergence speed in many instances because of constraints of real-time processing. In such a case, the order $p_n$ in each subband is determined so that the echo canceler attains the highest level of performance as a whole within a given operation time.

As described above, by setting the order of the ESP algorithm in each subband at the most desired value for the echo canceler, the effect of emphasizing the cross-correlation n variation and the whitening effect by raising the order of the ESP algorithm can sufficiently be produced; therefore, an echo canceler of fast convergence can be configured.

Figure 18:
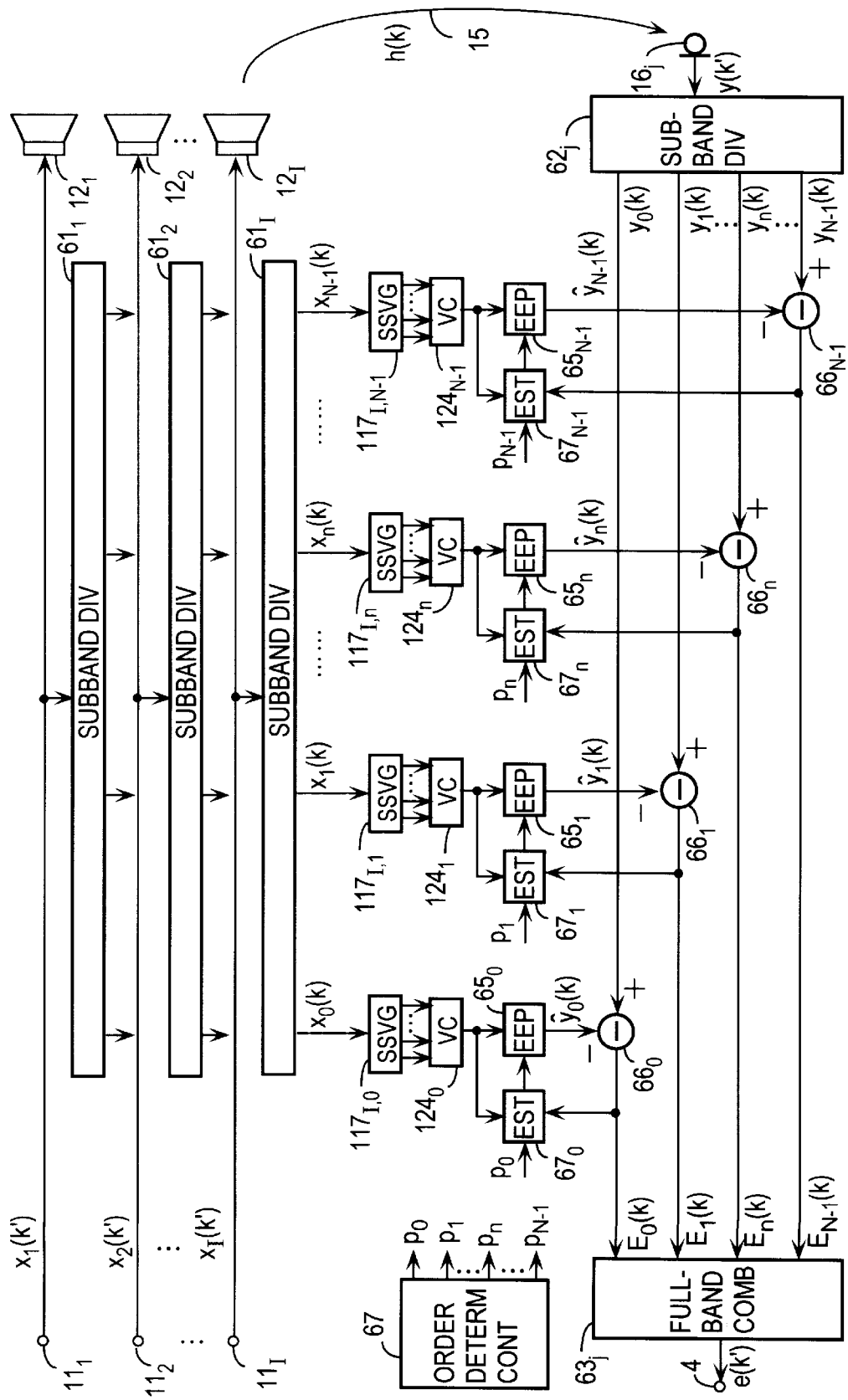
FIG. 18 is a block diagram illustrating an example of the functional configuration of another embodiment of the present invention.

FIG. 18 illustrates in block form the functional configuration of another embodiment of the present invention, which differs from the FIG. 7 embodiment in the subband analysis scheme and in that the signals $X_n(k)$, $Y_n(k)$ and $E_n(k)$ and the estimated echo path vector $\hat{H}_n(k)$ are complexes. An echo canceler using the same subband analysis scheme is described in the afore-mentioned literature by S. Gay and R. Mammone. The received signal x(k') is divided by a subband analysis part $61_j$ into N subband complex signals $X_{in}(k)$ (where n=0,1, . . . ,N−1). Similarly, the echo $y_j(k')$ is divided by a subband analysis part $62_j$ into N subband complex signals $Y_{jn}(k)$. Since the same processing is carried out for all j's, j will be omitted for brevity's sake.

In each subband there are provided a received signal storage/vector generating part $117_n$, a vector combining part $124_n$ and an estimated echo path $65_n$, and an echo replica $\hat{Y}_n(k)$ from the estimated echo path $65_n$ is subtracted by a subtractor $66_n$ from the subband echo $Y_n(k)$ to cancel it.

The estimated echo path (a complex FIR filter) $65_n$ needs to follow temporal variations of the echo path 15; the estimated echo path $65_n$ is iteratively estimated by an estimation part $67_n$ using a complex projection or complex ESP algorithm so that the error or residual $E_n(k)=Y_n(k)-\hat{Y}_n(k)$ approaches zero, and the estimated echo path $65_n$ is adjusted accordingly this ensures an optimum echo cancellation at all times.

The error signals $E_n(k)$ in the respective subbands are combined by a subband synthesis part $63_j$ into a full band signal e(k'). This division/synthesis process can efficiently be carried out using an N point FFT.

Figure 19:
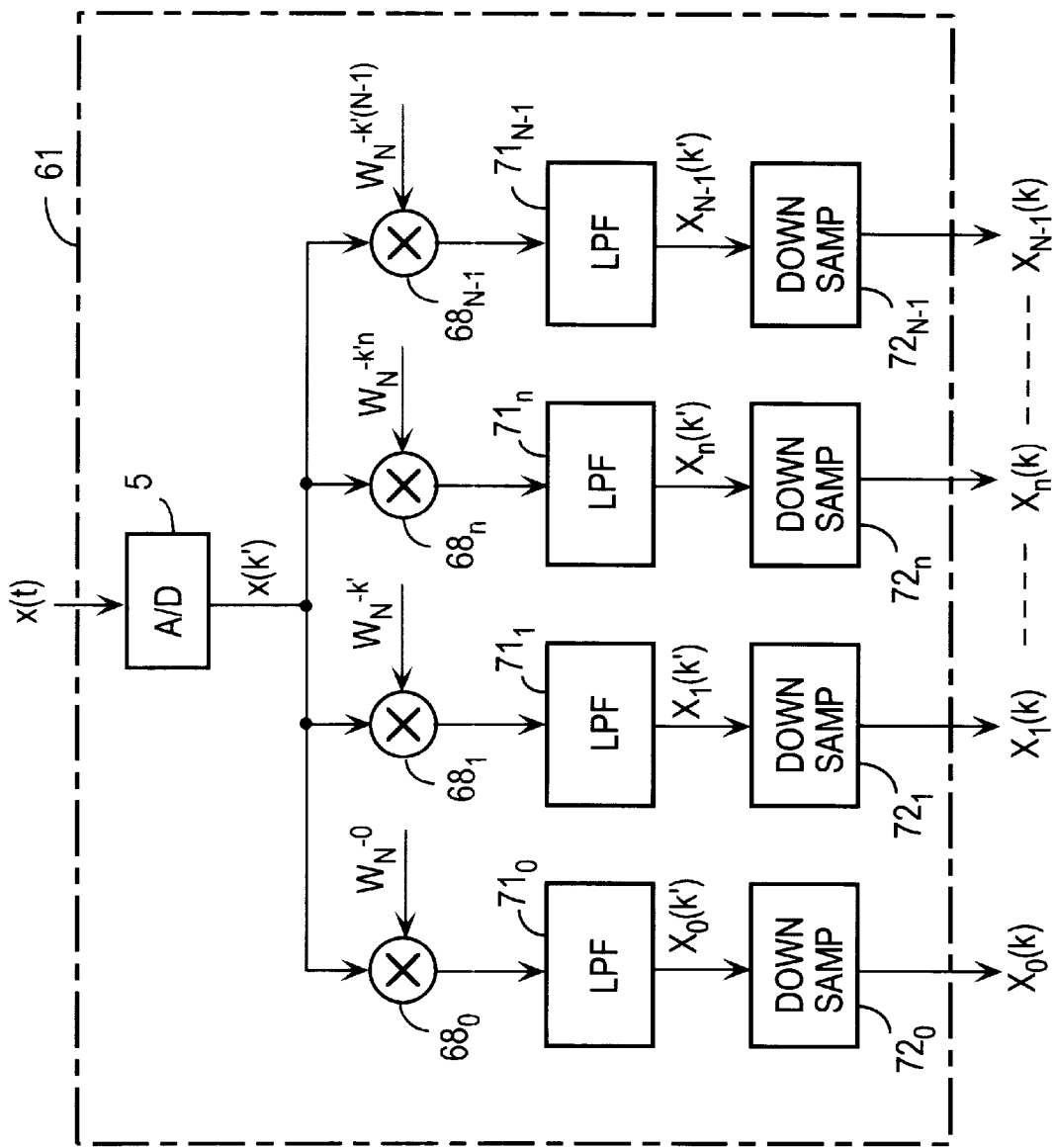
FIG. 19 is a block diagram illustrating an example of the functional configuration of a subband analysis part 61 in FIG. 18.
Figure 20:
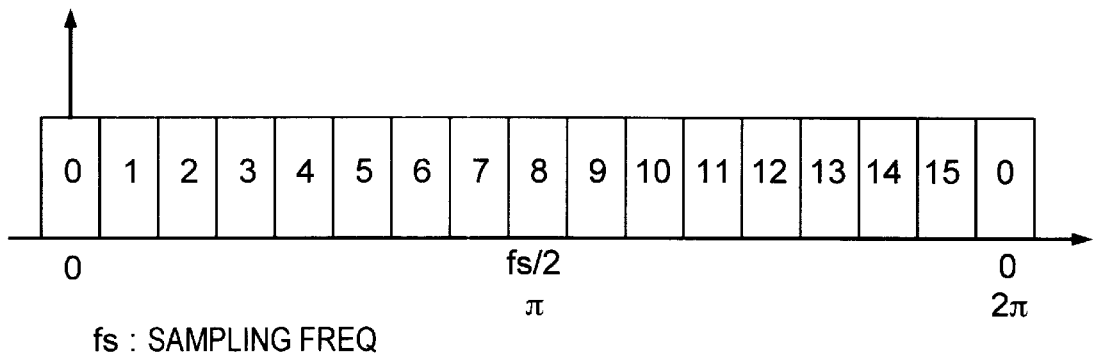
FIG. 20 is a diagram showing an example of a subband signal.

FIG. 19 illustrates the internal configuration of the subband analysis part 61, wherein the received signal x(t) is sampled by the A/D converter 5, then the sampled received signals x(k') are each multiplied by a multiplier $68_n$ by $W_N^{-k'n}=\exp\{-j2\pi k'n/N\}$, and the multiplied output is band limited by a low-pass filter $71_n$ of a pass band width from $-\pi/N$ to $\pi/N$, and hence is divided into N subbands. The thus band-limited signal $X_n(k')$ is down sampled with the down sampling ratio R to obtain the subband signal $X_n(k)$. The subband signals $X_0(k)$ to $X_{N-1}(k)$ of the full band correspond to a short-time spectrum. In FIG. 20 there are shown subbands when N=16. Of the 16 subband signals, the signals 0 and 8 are real numbers and the other signals are complexes. The subbands symmetrical with respect to the subband 8 (subbands 7 and 9, for example) bear a complex conjugate relation to each other, and the full band signal could be synthesized by a total of nine subband signals (two real numbers and seven complexes).

Figure 21:
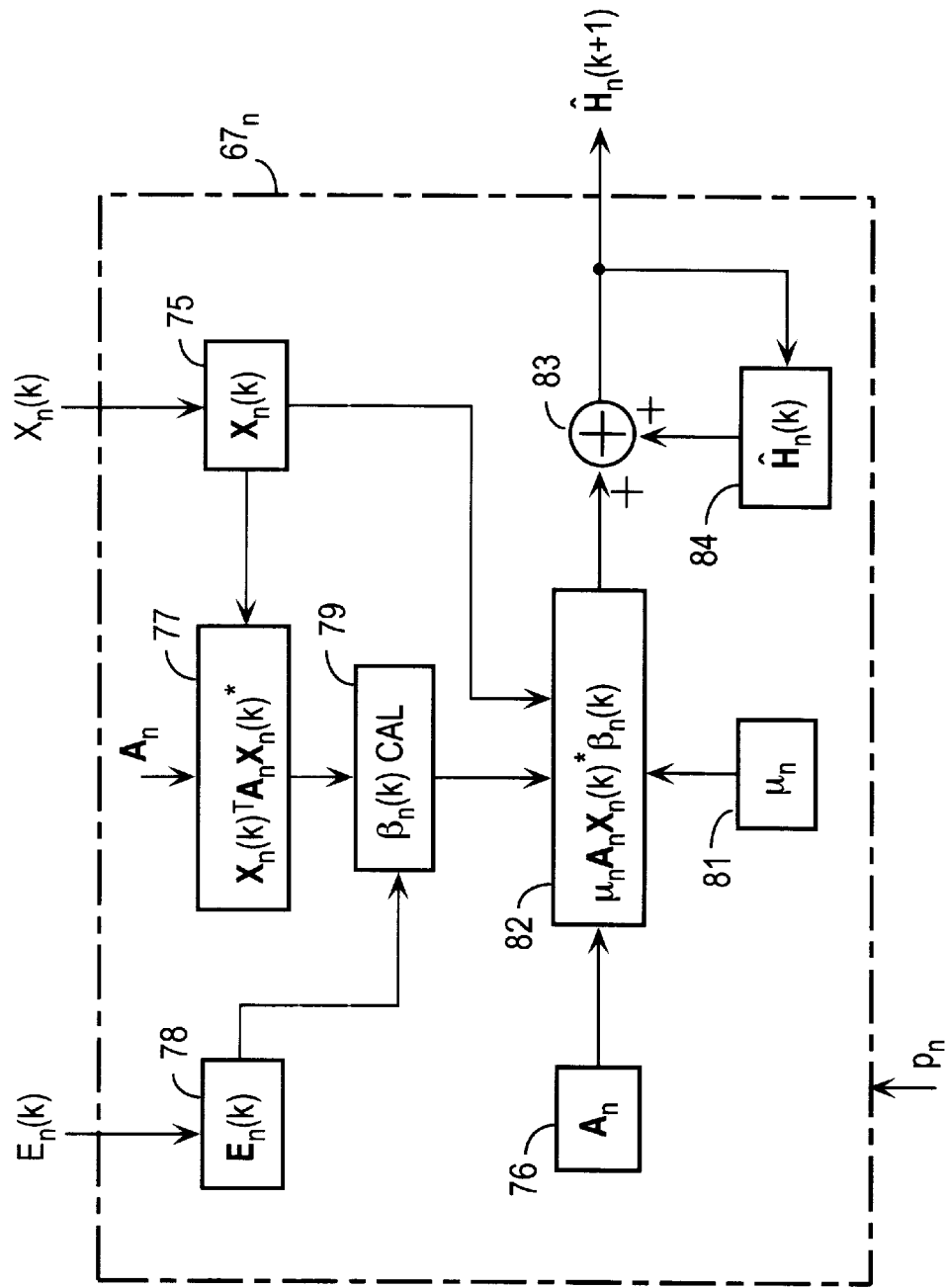
FIG. 21 is a block diagram illustrating an example of the functional configuration of an n-th subband estimation part $67_n$ in FIG. 18.

FIG. 21 illustrates an example of the internal configuration of the n-th subband estimation part $67_n$ which uses the $p_n$-th order complex ESP algorithm (complex projection algorithm when A=I).

The subband received signal $X_n(k)$ is fed to a received signal storage part 75, wherein it is rendered to the subband received signal matrix $X_n(k)$. In this instance, the subband received signals $x_n(k)$ of the first to I-th channels are vector-combined by the same processing as in the vector combining part 24 in FIG. 9 and the subband received signal matrix $x_n(k)$ is input into the received signal storage part 75. In a step size matrix storage part 76 there is stored the first step size matrix $A_n$. The step size matrix $A_n$ is weighted with the impulse response variation characteristic in the corresponding subband. In an ordinary room, the impulse response variation in the n-th subband is expressed as an exponential function using an attenuation ratio $\gamma_n$. An auto-correlation calculating part 77 calculates an auto-correlation matrix $X_n(k)^T A_n X_n^*(k)$ of the subband received signal matrix $X_n(k)$ weighted with the first step size matrix $A_n$, where * represents a complex conjugate. The thus calculated auto-correlation matrix and the error or residual $E_n(k)$ are fed to a $\beta_n(k)$ calculating part 79 to solve the following simultaneous linear equation with $p_n$ unknowns to obtain the constant $\beta_n(k)$.

$$[X_n(k)^T A_n X_n^*(k)]\beta_n(k)=E_n(k) \quad (45)$$

To avoid instability in the inverse matrix operation, a small positive constant $\delta_n$ is used as follows:

$$[X_n(k)^T A_n X_n(k)+\delta_n I]\beta_n(k)=E_n(k) \quad (45)'$$

where I represents a unit matrix.

The first step size matrix $A_n$, the received signal vector matrix $X_n(k)$, the constant $\beta_n(k)$ and the step size $\mu_n$ from a step size storage part 81 are provided to an adjustment information generating part 82 to calculate the following equation.

$$\mu_n A_n X_n^*(k)\beta_n(k) \quad (46)$$

The calculated output is fed to an adder 83, wherein it is added to the coefficient vector $\hat{H}_n(k)$ from a tap coefficient storage part 84 to obtain $\hat{H}_n(k+1)$. The calculated result $\hat{H}_n(k+1)$ is provided to the estimated echo path $65_n$ and, at the same time, it is fed to the tap coefficient storage part 84 to update the value stored therein.

By the above-described operation, the estimated echo path $65_n$ is iteratively updated following equation (47) and its impulse response $\hat{H}_n(k)$ approaches the impulse response $H_n(k)$ of the true echo path.

$$\hat{H}_n(k+1)=\hat{H}_n(k)+\mu_n A_n X_n^*(k)\beta_n(k) \qquad (47)$$

where $A_n=\text{diag}[\alpha_{n1},\alpha_{n2},\ldots,\alpha_{nLn}]$
: step size matrix in the n-th subband $\alpha_{n1}=\alpha_{no\gamma n}^{1-1}$ (1=1, 2, ..., $L_n$)

$\gamma_n$: attenuation ratio of the impulse response variation in the n-th subband $L_n$: number of taps in the n-th subband $\hat{H}_n(k)=[\hat{h}_{n1}(k),\hat{h}_{n2}(k),\ldots,\hat{h}_{nLn}(k)]^T$
: estimated echo path vector in the n-th subband $E_n(k)=[E_n(k), (1-\mu_n)E_n(k-1), \ldots, (1-\mu_n)^{p_n-1}E_n(k-p_n+1)]^T$ $E_n(k)=Y_n(k)-\hat{H}_n(k)^T X_n(k)$
: estimation error in the n-th subband $X_n(k)=[x_n(k),x_n(k-1),\ldots,x_n(k-p_n+1)]$ $x_n(k)=[x_n(k),x_n(k-1),\ldots,x_n(k-L_n+1)]^T$
: received signal vector in the n-th subband $\beta_n(k)=[\beta_{n1},\beta_{n2},\ldots,\beta_{npn}]^T$ $\mu_n$: second step size (scalar quantity) in the n-th subband

*: complex conjugate

As is the case with the FIG. 7 embodiment, the number of taps in each subband has been reduced by down sampling. The variation of the cross-correlation and the spectrum differ with the subbands. As a result, the lowest order of the complex ESP algorithm for saturation of the convergence speed in each subband also differs with the subbands. The order Pn of the ESP algorithm in each subband can be determined by the same methods as the three schemes described above in respect of the FIG. 7 embodiment.

Figure 22:
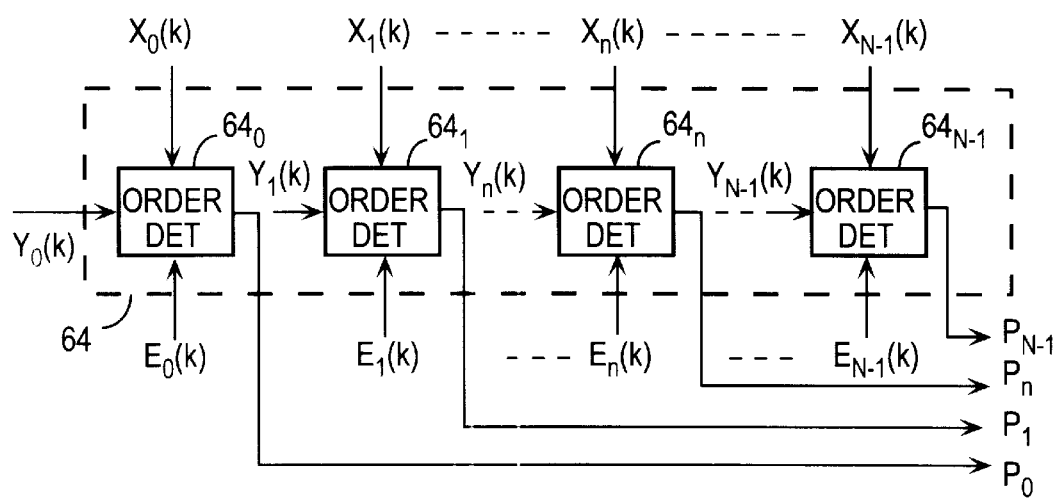
FIG. 22 is a block diagram illustrating an example of the configuration of an order determination control part 64 for use in the application of the first or second order determining scheme in FIG. 14.

FIG. 22 illustrates an example of the functional configuration of the order determination control part 64 in FIG. 14 which is used for the application of the first or second order determining scheme. There are provided order determining parts $64_0$ to $64_{N-1}$ respectively corresponding to the subbands. Each order determining part $64_n$ is supplied with the subband complex received signal $X_n(k)$, the subband complex echo $Y_n(k)$ and the complex error signal $E_n(k)$ and, as in the case of FIG. 12, it determines the order $p_n$ of the complex ESP algorithm as described below.

With the first and second schemes, the convergence of the ERLE value $r_s=20\log_{10}(Y_s/E_s)$, calculated from $Y_n=Y_s$ and $E_n=E_s$, is observed with the order $p_n$ changed to $p_n=p_s$, where s=1, 2, ... As the order $p_s$ becomes higher, the convergence speed increases and approaches a point of saturation as depicted in FIG. 13. The order $p_n=p_s$, at the time when the convergence speed is decided to have become sufficiently saturated, is set in the estimation part $67_n$. That is, in the case of using the first scheme, as described previously with respect to FIG. 13, the ERLE value $r_s=20\log_{10}(Y_s/E_s)$ at a predetermined time $k_k$ after the start of echo cancellation is calculated for each order $p_s$, and the order $p_s$, at the time when the ratio, $R_s=(r_s-r_{s-1})/(p_s-p_{s-1})$ of the difference between the current and immediately preceding ERLE values $r_s$ and $r_{s-1}$ to the difference between the current and immediately preceding orders $p_s$ and $p_{s-1}$ becomes smaller than the threshold value $R_{th}$, is determined to be the order $p_n$ of the complex ESP algorithm. In the case of the second scheme, the time $k_s$ at which the ERLE value $r_s=20\log_{10}(Y_s/E_s)$ reaches the predetermined value $r_k$ after the start of echo cancellation is calculated for each order, and the order $p_s$, at the time when the ratio, $R=(k_{s-1}-k_s)/(p_s-p_{s-1})$, of the difference between the times $k_s$ and $k_{s-1}$ detected in the echo cancellation of the current and immediately preceding orders $p_s$ and $p_{s-1}$ to the difference between the current and immediately preceding orders $p_s$ and $p_{s-1}$ becomes smaller than the threshold value $R_{th}$, is determined to be the order $p_n$ of the complex ESP algorithm.

Figure 23:
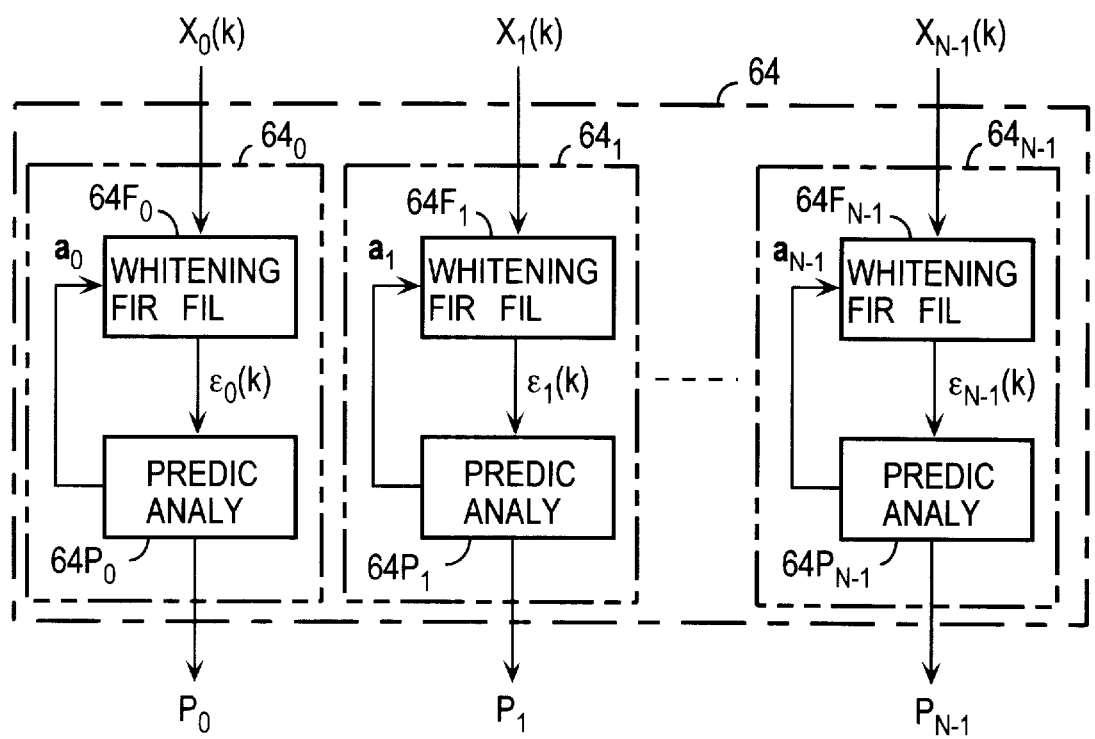
FIG. 23 is a block diagram illustrating an example of the configuration of the order determination control part 64 for use in the application of the third order determining scheme in FIG. 14.
Figure 24:
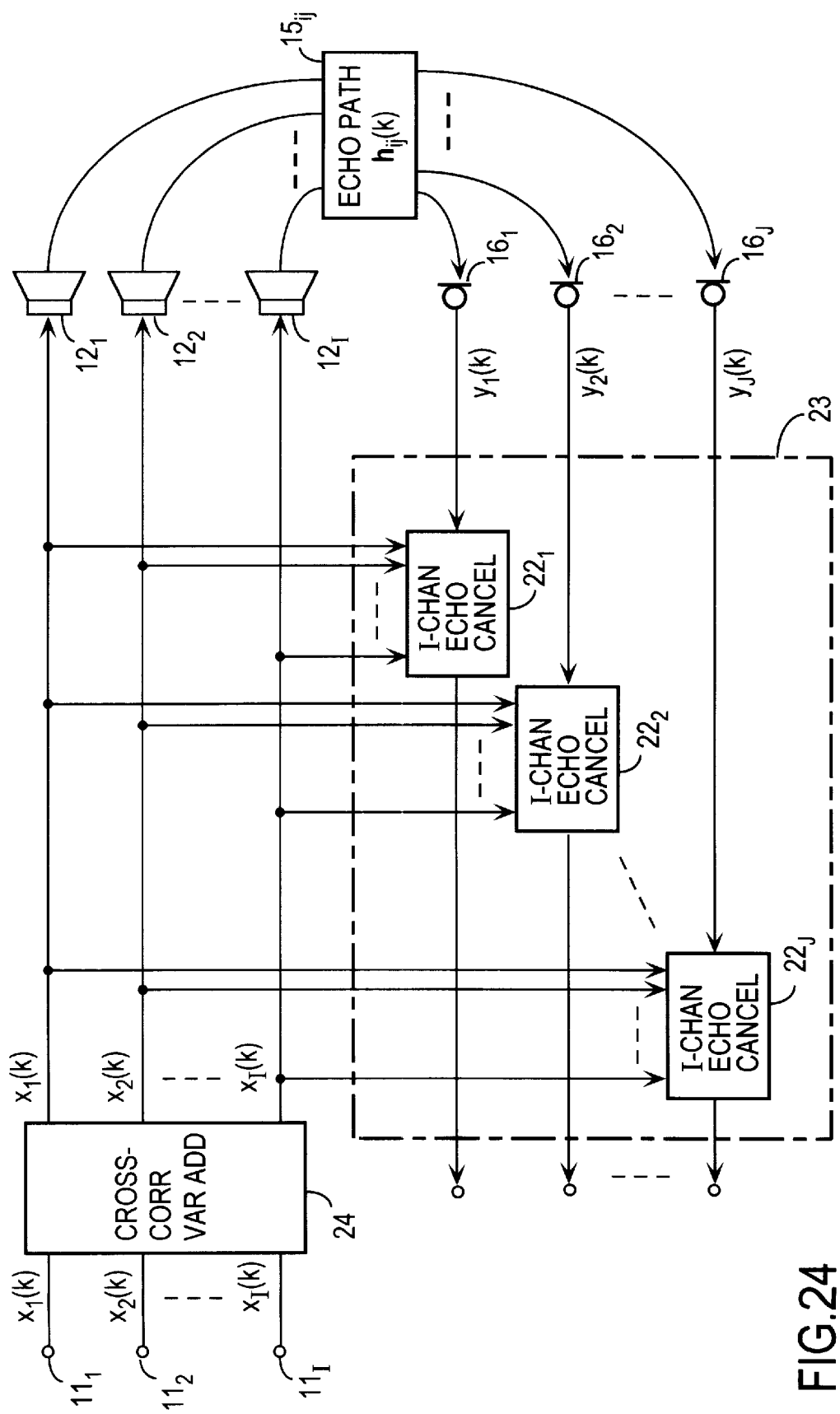
FIG. 24 is a block diagram illustrating the configuration of a multichannel echo canceller employing a third method according to the present invention.

FIG. 23 illustrates an example of the configuration of the order determination control part 64 for use in the application of the third order determining scheme in FIG. 14. As in the case of FIG. 16, the order determining part $64_n$ (n=0,1, ..., N-1) in each subband is formed by a $(p_n-1)$-th whitening FIR filter $64F_n$ and an LPC analysis part $64P_n$. The subband complex signal $X_n$, is applied to the $(p_n-1)$-th whitening FIR filter $64F_n$, then an LPC analysis is made by the LPC analysis part $64P_n$ to determine the prediction coefficient $a_{ni}$ (where i=1,2, ..., $p_n-1$), and the estimation error vector $\epsilon_n(k)$ is calculated from $X_n(k)a_n(k)$. Further, the covariance matrix $Q_n(k)=\epsilon_n(k)\epsilon_n(k)^T$ of the estimation error vector is calculated, then its $L_n$ eigen values are calculated, and the ratio $C_s=\lambda_{max}/\lambda_{min}$ between the maximum and minimum ones of the eigen values are calculated. This ratio $C_s$ becomes smaller as the order $p_s$ becomes higher, and the order $p_s$ at the time when the ratio $C_s$ becomes smaller than the predetermined value $C_{th}$ is determined to be the order $p_n$ of the complex ESP algorithm.

As in the FIG. 7 embodiment, it is also possible to determine the orders $p_n$ of the projection algorithm with respect to various speech sounds, various numbers N of subbands and the number of taps $L_n$ and prestore a standard value of the order $p_n$ in an ROM so that it is provided to the estimation part $6_n$ from the ROM, for example, at turn-on. When using the DSP to construct the echo canceler, the order of the complex ESP algorithm cannot be raised up to the level of complete saturation of the convergence speed in many instances because of constraints by real-time processing. In such a case, the order $p_n$ in each subband is determined so that the echo canceler attains the highest level of performance as a whole within a given operation time.

As described above, by setting the order of the complex ESP algorithm in each subband to the optimum order, the effects of emphasizing the cross-correlation variation and whitening the input signal by raising the order of the complex ESP algorithm can sufficiently be produced; hence, an echo canceler of fast convergence can be implemented.

Furthermore, since the room reverberation time is usually long in the low frequency band and short in the high frequency band, it is preferable to set the number of taps $L_n$ of the estimated echo path in the low frequency band large and the number of taps in the high frequency band small, and hence to set the projection order $p_n$ in the low frequency band high and the projection order in the high frequency band low. Moreover, in the low frequency band the number of taps $L_n$ is preferably set large and hence the order $p_n$ of the projection algorithm is also set sufficiently large through utilization of the fact that, in the case of a speech signal, for example, the signal energy much concentrates in the low frequency band regardless of age or sex, as shown in FIG. 11; thus, in the high frequency band, it is possible to decrease the number of taps $L_n$ and set the order $p_n$ of the projection algorithm low. Furthermore, it is possible to set the number of taps in the low frequency band large and hence the projection order high and set the number of taps in the high frequency band small and hence the projection order low by making use of the fact that the human hearing sensitivity is usually high in the low frequency band and low in the high frequency band. By setting the number of taps $L_n$ in the high frequency band small or the projection order $p_n$ low as mentioned above, the computational complexity of the entire projection algorithm can be reduced. In the case of speech, the frequency band is divided into, for example, 32 subbands; the projection order is set at 16 in the first and second lowest subbands, 8 in the third and fourth subbands, 4 in the fifth to eighth subbands, 2 in the ninth to 16th subbands and 1 in the remaining higher subbands.

Incidentally, it is considered to be practical in the above that the number N of the subbands is in the range of 32 to 64; when the number of subbands is too large, the delay increases. The frequency band need not always be divided into subbands of different widths as shown in FIG. 11 but it may be divided into subbands of the same width. The scheme 1 for the determining the optimum order $p_n$ in each subband is free from errors.

FIG. 23 illustrates an embodiment of the third scheme according to the present invention. The parts corresponding to those in FIG. 7 are identified by the same reference numerals. In this embodiment a cross-correlation variation adding part 24 is provided, by which received signals $x_1(k)$, $x_2(k)$, . . . , $X_I(k)$ of respective channels are converted to $\bar{x}_1(k)$, $\bar{x}_2(k)$, . . . , $\bar{x}_I(k)$ by being actively added with variations of their cross-correlations. These signals $\bar{x}_1(k)$, $\bar{x}_2(k)$, . . . , $\bar{x}_I(k)$ are reproduced or radiated from loudspeakers $12_1$, $12_2$, . . . , $12_3$ and, at the same time, they are input into the echo cancellation system 23 and used to derive the adjustment vector for the estimated echo path vector.

In the implementation of the cross-correlation variation adding part 24, care should be taken so that the psychoacoustic quality of the converted received signals $\bar{x}_1(k)$, $\bar{x}_2(k)$, . . . , $\bar{x}_1(k)$ would not be impaired when they are reproduced as acoustic signals. It must be noted here that the human hearing characteristic differs for each subband and that degradation of the psychoacoustic quality of the received signals also differs for each subband.

The variation in the cross-correlation between received signals of respective channels can be added thereto by (a) filter processing, (b) signal multiplication processing, (c) signal addition processing and (d) pitch shift processing. These methods will hereinafter be described one after another.

(a) Method by Filter Processing

The received signals $x_1(k)$, $x_2(k)$, . . . , $x_I(k)$ of respective channels are input into time-variant filters with different time-variant characteristics, wherein they are convoluted (indicated by *) with impulse responses $f_1(k)$, $f_2(k)$, . . . , $f_I(k)$ of the filters for conversion into signals $\bar{x}_1(k)$, $\bar{x}_2(k)$, . . . , $\bar{x}_L(k)$ which are expressed as follows:

$$\bar{x}_1(k)=f_1(k)*x_1(k)$$
$$\bar{x}_2(k)=f_2(k)*x_2(k)$$
$$\bar{x}_I(k)=f_I(k)*x_I(k) \quad (48)$$

By this, the variation in the cross-correlation between the received signal of respective channels can be added thereto.

It is said that amplitude information is mainly important for the psycho-acoustic perception and that phase information is not so important. This is described in, for example, Furui, "Digital Speech Processing," Tokai University Press. It is considered, therefore, that the psycho-acoustic influence of filter processing would be lessened by implementing the time-variant filter so that the amplitude characteristic remain flat with respect to the frequency of each input signal.

A filter that serves this purpose is an IIR filter which has an all-pass transfer function. The transfer function F(z) of this filter can be expressed as follows:

$$F(z)=A\{z^{-K}-a_1z^{-(K-1)}+ \ldots +(-1)^{K-1}a_{n-1}z^{-1}+(-1)^K a_K\}/\{1-a_1z^{-1}+ \ldots +(-1)^{K-1}a_{K-1}z^{-1(K-1)}+(-1)^K a_K z^{-K}\} \quad (49)$$

where K is the order. Let the sampling interval and the angular frequency be represented by T and $\omega$, respectively. No matter what values the filter coefficients $a_1, a_2, \ldots, a_K$ are set to take, the denominator and the numerator cancel with each other and the amplitude characteristic equation $|F|(\exp(j\omega T))|$ takes a fixed gain A independent of the angular frequency $\omega$. On the other hand, the phase characteristic differs with the filter coefficients $a_1, a_2, \ldots, a_K$. When the coefficients $a_1, a_2, \ldots, a_K$ are varied with time, a time-variant phase characteristic is provided, but it has no influence on the amplitude characteristic.

Now, a description will be given of a secondary all-pass filter which is simple-structured and easy to implement. The configuration of the secondary all-pass filter is described in detail, for example, in Tsujii, "Basics of Digital signal Processing," IEICE, Japan. For brevity, setting the gain A=1 in Eq. (49), the secondary all-pass transfer function F(z) is given as follows:

$$F(z)=(z^{-2}a_1z^{-1}+a_2)/(1-a_1z^{-1}+a_2z^{-2}) \quad (50)$$

When the filter is configured as a lattice model based on this transfer function, the coefficients in Eq. (50) are replaced with $$a_1=-\gamma(1+\gamma_2) \quad (51)$$

$$a_2=\gamma_2 \quad (52)$$

and the transfer function of Eq. (50) is expressed by the following equation (53).

$$F(z)=\{z^{-2}+\gamma_1(1+\gamma_2)z^{-1}+\gamma_2\}/\{1+\gamma_1(1+\gamma_2)z^{-1}+\gamma_2z^{-2}\} \quad (53)$$

An advantage of the lattice-type filter configuration in the present invention is that $\gamma_1$ and $\gamma_2$ can be handled as parameters of independent meanings. When the group delay characteristic of the transfer function F(z) of Eq. (53) has a peak, the peak frequency depends virtually only on $\gamma_1$ and the steepness of the peak depends virtually only on $\gamma_2$. That is to say, there is no need of varying all of the filter coefficients with time; for instance, only by causing $\gamma_1$ corresponding to the peak frequency of the group delay characteristic to undergo a different variation for each channel, effective time-variant characteristics can be obtained and the filter configuration can be simplified. By making these time-variant characteristics differ with the channels, it is possible to produce the effect of varying the cross-correlation between the original multi-channel received signals.

(b) Method by Signal Multiplication

The received signals $x_1(k)$, $x_2(k)$, . . . , $x_I(k)$ of respective channels are multiplied by different functions $g_1(k)$, $g_2(k)$, . . . , $g_I(k)$ for conversion into signals $\bar{x}_1(k)$, $\bar{x}_2(k)$, . . . $\bar{x}_I(k)$ which are expressed as follows:

$$\bar{x}_1(k)=g_1(k)\cdot x_1(k)$$
$$\bar{x}_2(k)=g_2(k)\cdot x_2(k)$$
$$\bar{x}_I(k)=g_I(k)\cdot x_I(k) \quad (54)$$

By this, the variation in the cross-correlation between the received signals can be added thereto.

If the functions $g_1(k), g_2(K), \ldots, g_I(k)$ take both positive and negative values in Eq. (54), it is considered that the quality of the received signals would seriously be degraded regardless of the magnitude of the variations in the functions. Hence, it is desirable that the functions $g_1(k)$, $g_2(k)$, ..., $g_I(k)$ always take only positive or negative values and that their variations be also limited. Now, consider the case where the functions $g_1(k)$, $g_2(k)$, ..., $g_I(k)$ are in such forms as mentioned below. Let the functions $g_1(k)$, $g_2(k)$, ..., $g_I(k)$ be expressed by the following equation (55) using different functions $\omega_1(k)$, $\omega_2(k)$, ..., $\omega_I(k)$ each having the maximum amplitude normalized to 1, scalar values $k_1, k_2, \ldots, k_I$ ($0<\|k_1\|, \|k_2\|, \ldots, \|k_I\|<1$) and gain coefficients A1, A2, ..., AI.

$$g_1(k)=A_1\{1+k_1\omega_1(k)\} g_2(k)=A_2\{1+k_2\omega_2(k)\} g_I(k)=A_I\{1+k_I\omega_I(k)\} \quad (55)$$

Since at given time k the following equation holds, the signs of the values $g_1(k)$, $g_2(k)$, ..., $g_I(k)$ remain unchanged.

$$-1<k_1\omega_1(k), k_2\omega_2(k), \ldots, k_I\omega_I(k)<1$$

From the viewpoint of the psycho-acoustic balance, it is desirable that the values of the gain coefficients A1, A2, ..., AI be equal or take values of the same sign; in this instance, the functions $g_1(k)$, $g_2(k)$, ..., $g_I(k)$ all take values of the same sign. Furthermore, the amount of distortion of each processed signal can be adjusted by the scalar values $k_1, k_2, \ldots, k_I$.

Moreover, from the viewpoint of a frequency shift, by setting the functions $g_1(k)$, $g_2(k)$, ..., $g_I(k)$ as follows:

$$g_1(k)=A_1\cos\{\omega_1(k)\cdot k+\phi_1\} g_2(k)=A_2\cos\{\omega_2(k)\cdot k+\phi_2\} g_I(k)=A_I\cos\{\omega_I(k)\cdot k+\phi_I\} \quad (56)$$

and by shifting the frequency characteristics of the received signals $x_1(k)$, $x_2(k)$, ..., $x_I(k)$ through the use of functions $\omega_1(k)$, $\omega_2(k)$, ..., $\omega_I(k)$ which have different time-variant characteristics and vary within certain limited ranges, the variation in the cross-correlation can be added to the original multi-channel received signals.

(c) Method by Signal Addition

The received signals $x_1(k)$, $x_2(k)$, ..., $x_I(k)$ of respective channels are added to different functions $n_1(k)$, $n_2(k)$, $n_I(k)$, respectively, for conversion into signals $\bar{x}_1(k)$, $\bar{x}_2(k)$, ..., $\bar{x}_I(k)$ which are expressed as follows:

$$\bar{x}_1(k)=x_1(k)+n_1(k)$$

$$\bar{x}_2(k)=x_2(k)+n_2(k)$$

$$\bar{x}_I(k)=x_I(k)+n_I(k) \quad (57)$$

By this, the variation in the cross-correlation between the received signals of respective channels can be added thereto.

From the viewpoint of the psycho-acoustic influence, it is desirable that the functions $n_1(k)$, $n_2(k)$, ..., $n_I(k)$ be moderately smaller in amplitude value than the received signals $x_1(k)$, $x_2(k)$, ..., $x_I(k)$ of the respective channels. In view of this, different functions $n_{r1}(k)$, $n_{r2}(k)$, ..., $n_{rI}(k)$, normalized so that the maximum amplitude becomes a rated value Ar of the amplitude of the received signals $x_1(k)$, $x_2(k)$, ..., $x_I(k)$ of the respective channels, are multiplied by scalar values $\lambda_1, \lambda_2, \ldots, \lambda_I$, by which the functions $n_1(k)$, $n_2(k)$, ..., $n_I(k)$ are expressed as follows:

$$n_1(k)=\lambda_1 n_{r1}(k) \; n_2(k)=\lambda_2 n_{r2}(k) \; n_I(k)=\lambda_I n_{rI}(k) \quad (58)$$

Based on the scalar values $\lambda_1, \lambda_2, \ldots, \lambda_I$, it is possible to determine the degree to which the magnitude of the signal to be added to each of the received signals $x_1(k)$, $x_2(k)$, ..., $x_I(k)$ is made smaller than the rated value Ar.

(d) Implementation by Pitch Shift Processing

The received signals $x_1(k)$, $x_2(k)$, ..., $x_I(k)$ of the respective channels are converted into signals $\bar{x}_1(k)$, $\bar{x}_2(k)$, ..., $\bar{x}_I(k)$ by subjecting the frequency characteristic of each received signal to different time-variant frequency axis expansion/compression processing or pitch shift processing. By this, the variation in the cross-correlation between the received signals of the respective channels can be added thereto.

The pitch shift processing involves time expansion/compression as well as frequency axis expansion/compression and can be performed in the time domain. When the time axis is compressed, interpolation processing is needed to make the duration of the processed signal equal to the duration of the original signal, whereas when the time axis is expanded, the duration of the processed signal becomes longer than the duration of the original signal; hence decimation processing is needed. Such interpolation/decimation processing can be implemented by detecting a silent duration and extending or removing it.

The embodiments of the echo cancellers according to the present invention may also be implemented by DSPs or computer software.

EFFECT OF THE INVENTION

As described above, the methods of the present invention can be applied to the cancellation of echoes to implement a teleconference system of highly realistic presence which permits transmission of acoustic spatial information from either point by using a multi-channel transmission system and terminal equipment provided with multi-channel microphone and loudspeaker systems between two point.

Figure 5:
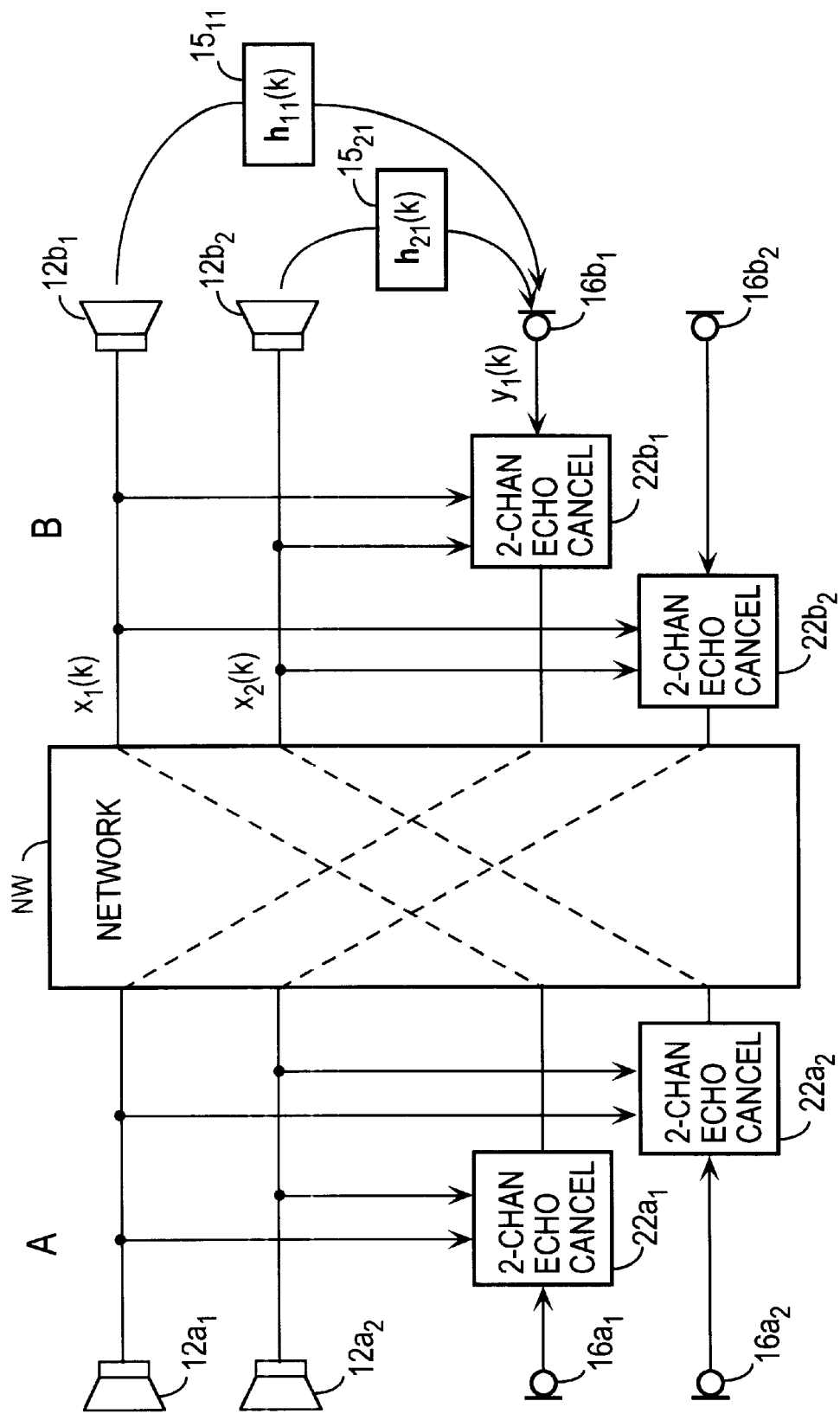
FIG. 5 is a block diagram illustrating a stereo telecommunication system.

Now, consider a stereo teleconferencing system which connects two points via a two-channel transmission system and uses two-channel microphone and loudspeaker systems as shown in FIG. 5. For instance, when a plurality of speakers alternately speak in their seats at the point A, the stereo speech signals that are picked up by two microphones bear a cross-correlation therebetween dependent on the positional relationship between the speakers and the microphones. When these speech signals are received at the point B and input into the conventional echo canceller, the echo path estimation depends on the cross-correlation and hence is incorrect, with the result that a large echo returns to the point A each time the speaker changes. In contrast to this, when the echo cancellation method of the present invention is used, a variation in the cross-correlation between the stereo received signals by the change of the speaker is extracted and used to correct an error in the echo path estimation; thus, it is possible to suppress the echo from increasing whenever the speaker changes. Furthermore, in the case where speech uttered by one person is picked up by a plurality of microphones, even if the speaker speaks at one place, the cross-correlation between the speech signals picked up by the microphone delicately changes. The method of the present invention permits effective utilization of such a slight variation in the cross-correlation between signals as well.

Figure 25:
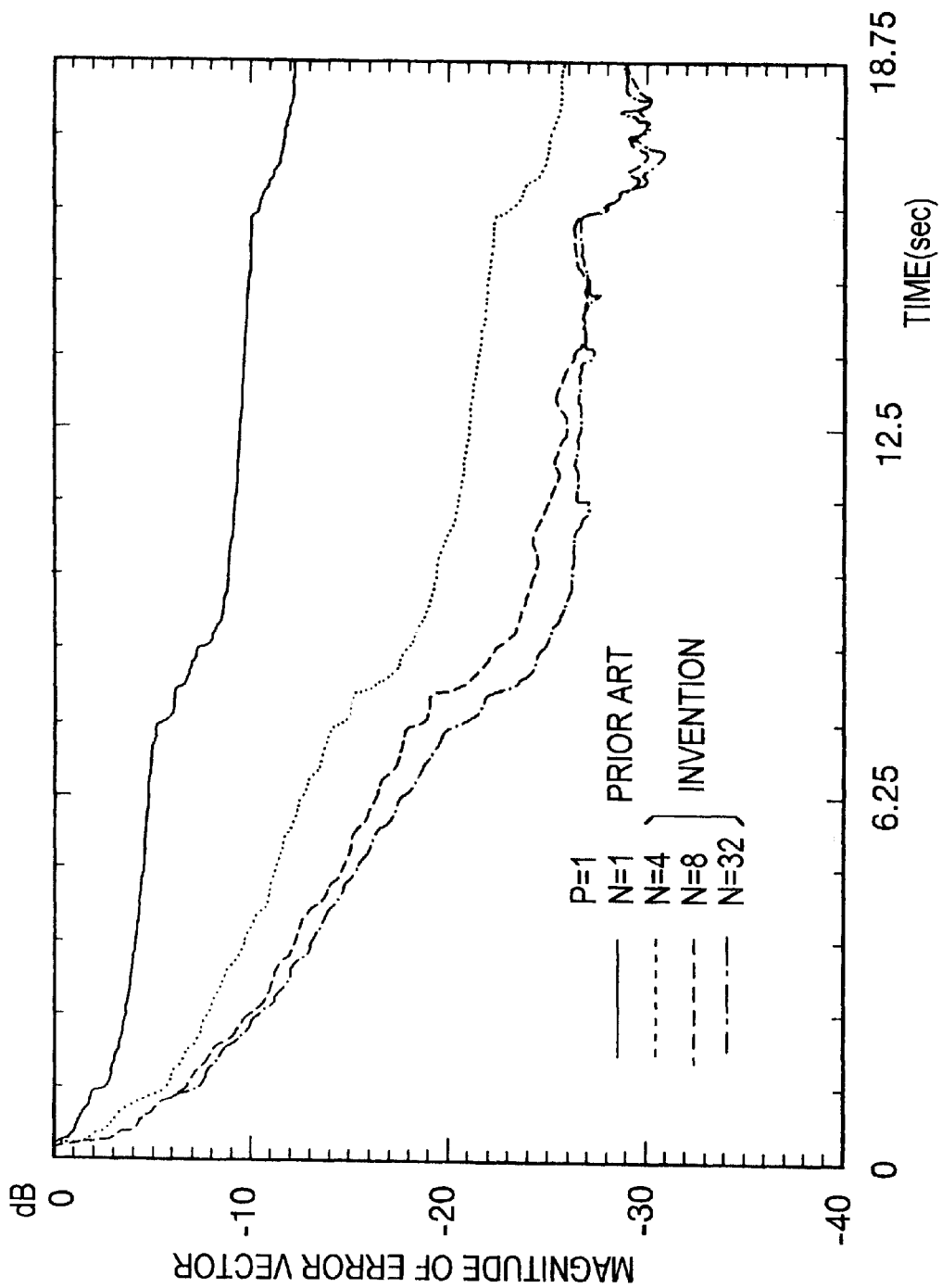
FIG. 25 is a graph showing the convergence of an estimated echo path vector according to the first method of the present invention.

In FIG. 25 there are shown the results of computer simulations on the convergence characteristic in the case of performing the echo cancellation processing with real-number signals $x_n(k)$ and $y_n(k)$ band-limited by the SSB method set forth in the afore-mentioned literature by Crochiere and Rabiner, instead of using the band-pass filters $20_0$ to $20_N$ in the subband analysis parts 51 and 52 (the part 52 is identical in construction to the part 51, and hence it is not shown) in the FIG. 7 embodiment. In the computer simulations a measured impulse response (512 taps, sampling frequency of 16 kHz). Signals obtained by stereophonically picking up speech sounds uttered by speakers with their bodies or heads fixed were used as received signals. Near-end noise was added to echoes in a manner to provide an SN ratio of 35 dB.

FIG. 25 shows, using the band dividing number N as a parameter, the magnitude of the error vector between the combined estimated echo path vector generated by the echo path estimation part and the combined true echo path vector. The extraction of the cross-correlation variation component by this invention method employs the p=1 order projection algorithm, i.e. the conventional NLMS algorithm. The band dividing number N=1,4,8,32. The decimation rate R=N/4. The number of taps in each subband was set at 512+512 when N=1 (full band) and it is set at small value according to the decimation rate. The second step size $\mu_n$ and the small positive constant $\delta_n$ were adjusted so that the same steady-state ERLE would be provided. When N=1, no subband division takes place, in which case the convergence of the error vector is slow and even after 10 sec elapsed, the error vector is as large as −10 dB. In contrast to this, when the frequency band is divided into N=4,8 and 32 subbands, the convergence is fast and the error vector becomes −10 dB within 2 to 3 sec and −20 to −26 dB in 12 to 15 sec. Thus, it will be seen that this invention method captures even a delicate variation in the cross-correlation between signals and corrects the echo path estimation error and that the larger the band dividing number N, the higher the convergence speed. This is an effect unpredictable in the past. It can be said that the invention increases the convergence speed by effectively capturing a delicate variation between channels through the use of the band dividing or subband analysis scheme.

Figure 26:
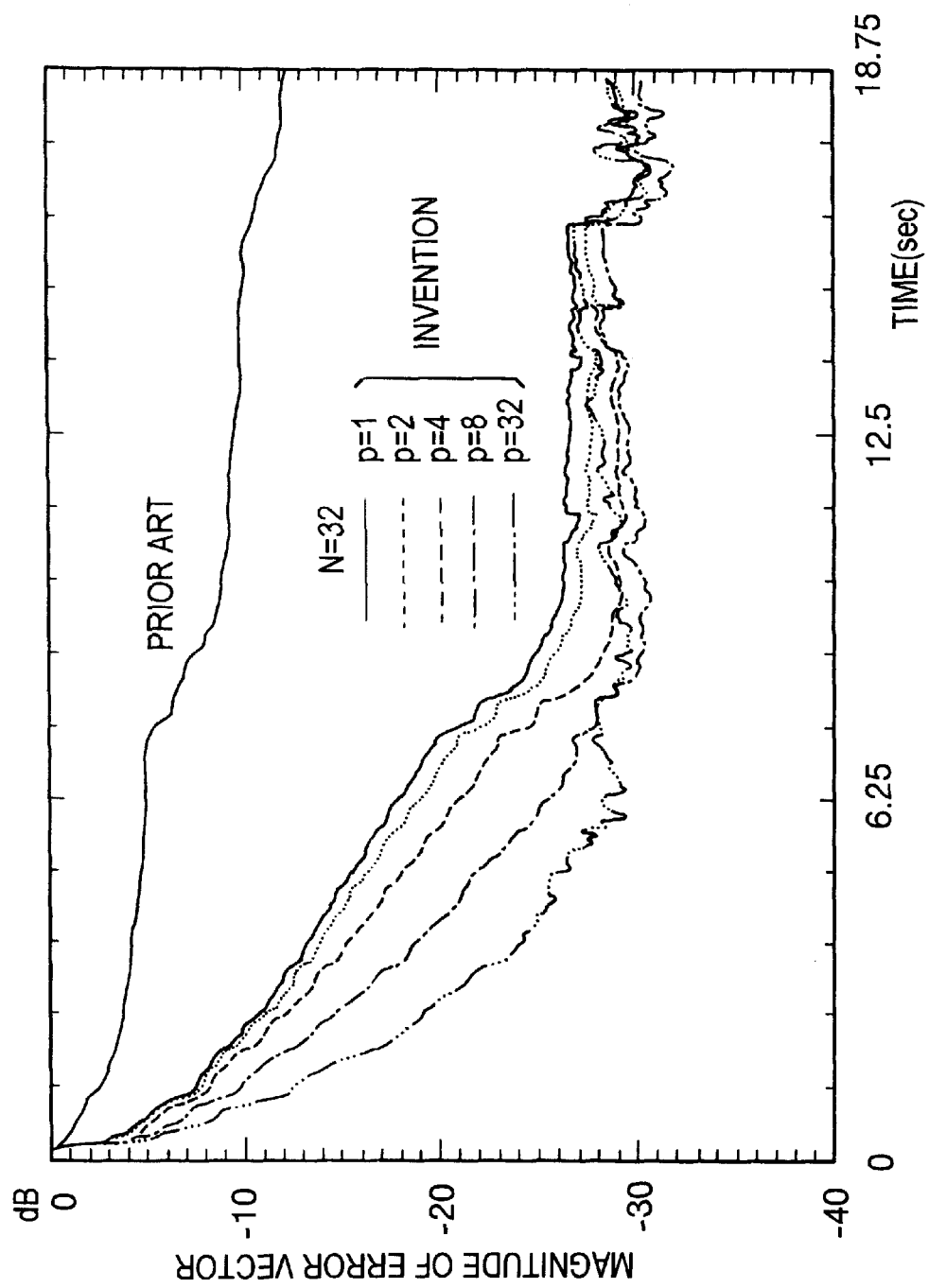
FIG. 26 is a graph showing the convergence of an estimated echo path vector according to the second method of the present invention.

FIG. 26 shows, using the order of the projection algorithm as a parameter, the convergence of the estimated echo path vector in the case of using received signals similar to those used in the computer simulations of FIG. 25. The band dividing number N is 32 and the decimation rate R is 8. The number of taps in each subband was 64+64. The order of the projection algorithm is $P_n$=1,2,4,8,32. The second step size $\mu_n$ and the small positive constant $\delta_n$ were adjusted so that the same steady-state ERLE would be provided. It will be seen that as the order $p_n$ of the projection algorithm is raised, the convergence speed increases. In addition, the convergence is appreciably faster than in the case of employing the conventional frequency dividing method. From FIG. 26 it is understood that the band division and the use of the projection algorithm are effective. Thus, according to the present invention, a high convergence speed can be achieved with a small projection order. In the hands-free communication system, the echo path frequency varies due to movements of persons and a quick accommodation of such variation is a great advantage.

Furthermore, by determining an appropriate projection order according to each subband, fast convergence can be achieved with a smaller computation load.

Figure 27:
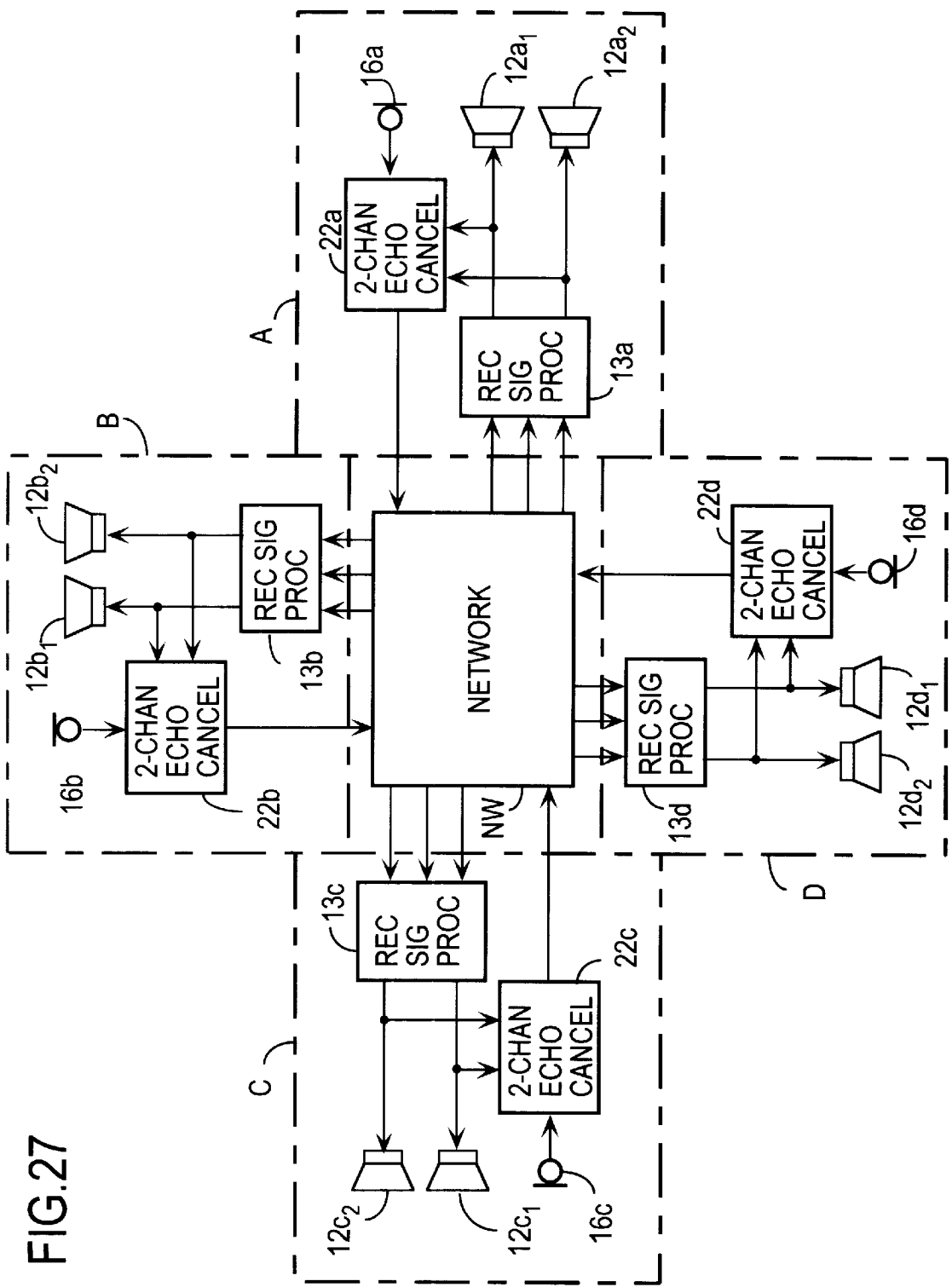
FIG. 27 is a block diagram illustrating an audio teleconferencing system that provides a sound image localization function in a four-point communication.

Other than a method according to which at a terminal provided with a stereo receiving system, two-channel stereo signals picked up at the other side are received and reconstructed intact as shown in FIG. 5, there is a proposed method for multi-point teleconference by which the received signal for each point is freely subjected to sound image localization at the receiving side to provide a comfortable receiving environment. The method of the present invention is also applicable to such multi-point teleconferencing terminals. FIG. 27 illustrates the configuration of teleconferencing system for four points interconnected via a network.

At each point, the sending or microphone system is one-channel (monaural). Now, the point D will be described. Let it be assumed that at the point D, received signals from the points A, B and C are subjected to sound image localization in a received signal processing part 13d so that the signals are localized at the right, center and left with respect to the point D, respectively, by which new two-channel stereo received signals are generated for stereo reconstruction. With this method, the cross-correlation between the received signals is constant and, in this case, no variation exists in the cross-correlation between the received signals, and hence it can be neither extracted nor utilized; accordingly, the echo path estimation remains slow as in the prior art and cannot be improved. If the third method of the present invention is used, the cross-correlation n between the received signals always varies and, as in the above-mentioned case, the variation in the cross-correlation between the stereo received signals is extracted and the echo path estimation error is corrected; hence, it is possible to speed up the echo path estimation and to suppress the echo from increasing, as compared with the conventional method.

That is, in the case of applying the conventional echo cancellation method to the teleconferencing system usually composed of a multi-receive-channel system and a multi-pickup-channel system, when received signal of respective channels have a cross-correlation, the estimated echo path is not correctly estimated, giving rise to a problem that the echo increases upon each variation of the cross-correlation. According to the first method of the present invention, since the echo path estimation error is corrected by extracting and utilizing the variation component of the cross-correlation between the received signals through the use of the subband scheme, the above-mentioned problem can be settled.

According to the second method of the present invention, since the echo path estimation error is corrected by extracting and utilizing the variation component of the cross-correlation between the received signals through the use of the subband scheme and the ESP algorithm, the above-mentioned problem can be settled, and by determining an appropriate projection order according to each particular subband, fast convergence can be achieved with decreased computational complexity.

According to the third method of the present invention, because of the function of adding received signals with a variation in their cross-correlation, the echo path estimation does not completely stops at a wrong solution but proceeds in a direction in which to reduce the error between the estimated echo path and the true one. Hence, this method also corrects the above-mentioned problem and, further, by determining an appropriate cross-correlation variation adding function in accordance with each particular subband, fast convergence can be achieved without causing any psychoacoustic problems.

It will be apparent that many modifications and variations may be effected without departing from the scope of the novel concepts of the present invention.

What is claimed is:

1. A subband echo cancellation method for a multichannel teleconference in which received signals of plural channels are reproduced as acoustic signals by loudspeakers corresponding to said plural channels, said acoustic signals being received by at least one microphone after propagating over each echo path thereto, an echo replica being subtracted from an echo provided from said at least one microphone, an echo cancellation error signal resulting from said subtraction and said received signal of each of said plural channels being used to calculate an adjustment vector, said adjustment vector being used iteratively to adjust an estimated value of an impulse response of each echo path, estimated echo paths having said adjusted impulse response being generated for each of said echo paths, and the corresponding one of said received signals being applied to each estimated echo path to generate said echo replica, the method further comprising the steps of:

(a) dividing said received signal and said echo into N subbands in each of said plural channels, and decimating them with predetermined decimation rates, respectively, to generate N subband received signals and N subband echoes, N being an integer equal to or greater than 2;

(b) generating N echo replicas by providing said N subband received signals to N estimated echo paths, each formed by a digital filter having a filter coefficient of a predetermined number of taps which simulates the impulse response of said echo path in each of said N subbands;

(c) subtracting said N echo replicas from corresponding N subband echoes to generate echo cancellation error signals in said N subbands;

(d) iteratively adjusting said filter coefficients of said digital filters in a manner to minimize said N echo cancellation error signals on the basis of said N echo cancellation error signals and corresponding N subband received signals; and (e) combining said echo cancellation error signals in said N subbands into a full band send signal having said echoes suppressed; and (f) extracting a variation component of the cross-correlation between said received signals of said channels as said adjustment vector.

2. The method of claim 1, wherein a combined received signal vector by combining received signal vectors of a sequence of received signals of each of said channels is calculated and a variation in the correlation between current and previous ones of said combined received signal vector is detected and used as said cross-correlation variation component.

3. The method of claim 2, wherein a method for detecting said variation in the cross-correlation between said current and previous combined received signal vectors in each of said channels is set optimum in said N subbands.

4. The method of claim 3, wherein said method for detecting said variation in the cross-correlation between said current and previous combined received signal vectors in each of said each channel is a projection algorithm or ESP algorithm and the projection order is set at an optimum value in each of said N subbands.

5. The method of claim 4, wherein the order of said projection algorithm or ESP algorithm is set at a minimum value at which the convergence speed of an echo return loss enhancement substantially saturates with respect to said received signal in said each subband, the number of taps of said digital filter corresponding to a lower one of said N subbands is larger than the number of taps corresponding to a higher subband.

6. The method of claim 4, wherein the order of said projection algorithm or ESP algorithm in each of said N subbands is set at a minimum value at which whitening of an estimation error vector at the time of having whitened said received signal by a linear predictive coding filter substantially saturates, the order of said projection or ES projection algorithm in said lower subband being set larger than the order of said projection or ES projection algorithm in said higher subband.

7. The method of claim 4, wherein the number of taps of said digital filter forming said estimated echo path in each of said N subbands is predetermined on the basis of at least one of the energy distribution in the frequency region of a desired one of said received signals, the room reverberation characteristic and the human psychoacoustic characteristic.

8. The method of claim 4, wherein the number of taps of said digital filter corresponding to a lower one of said N subbands is larger than the number of taps of said digital filter corresponding to a higher subband.

9. The method of claim 4, wherein the order of said projection algorithm or ESP algorithm in a lower one of said subbands is set larger than the order of said projection algorithm or ESP algorithm in a higher subband.

10. A subband echo cancellation method for a multichannel teleconference in which received signals of plural channels are reproduced as acoustic signals by loudspeakers corresponding to said plural channels, said acoustic signals being received by at least one microphone after propagating over each echo path thereto, an echo replica being subtracted from an echo provided from said at least one microphone, an echo cancellation error signal resulting from said subtraction and said received signal of each of said plural channels are used to calculate an adjustment vector, said adjustment vector is used to iteratively adjust an estimated value of an impulse response of said each echo path, estimated echo paths having said adjusted impulse responses corresponding to said each echo paths, and the corresponding one of said received signals is applied to said each estimated echo path to generate said echo replica, said method comprising the steps of:

(a) dividing said received signal and said echo into N subbands in each of said plural channels and decimating them with predetermined decimation rates, respectively, to generate N subband received signals and N subband echoes, N being an integer equal to or greater than 2;

(b) generating N echo replicas by providing said N subband received signals to N estimated echo paths each being formed by a digital filter having a filter coefficient of a predetermined number of taps which simulates the impulse response of said echo path in each of said N subbands;

(c) subtracting said N echo replicas from corresponding N subband echoes to generate echo cancellation error signals in said N subbands;

(d) iteratively adjusting said filter coefficients of said digital filters in a manner to minimize said N echo cancellation error signals on the basis of said N echo cancellation error signals and corresponding N subband received signals; and (e) combining said echo cancellation error signals in said N subbands into a full band send signal having said echoes suppressed;

(f) adding a variation component to the cross-correlation between said received signals of said plural channels, each of said received signals being reproduced by said loudspeaker of one of said plural channels; and (g) deriving said adjustment vector from said received signal added with said cross-correlation variation component.

11. The method of claim 10, wherein, letting the number of reproduction channels be represented by I and said received signals of said plural channels by $x_1(k)$, $x_2(k)$, . . . , $x_I(k)$ as functions of a discrete time k, said received signals $x_1(k)$, $x_2(k)$, . . . , $x_I(k)$ are input into time-variant filters with different time-variant characteristics for said plural channels, wherein they are convoluted, indicated by *, with impulse responses $f_1(k), f_2(k), \ldots, f_I(k)$ of said filters for conversion into signals $\bar{x}_1(k), \bar{x}_2(k), \ldots, \bar{x}_I(k)$ which satisfy $\bar{x}_1(k) = f_1(k) * x_1(k)$
$\bar{x}_2(k) = f_2(k) * x_2(k)$
$\bar{x}_I(k) = f_I(k) * x_I(k)$ whereby said variation component of said cross-correlation between said received signal of said plural channels is added thereto.

12. The method of claim 10, wherein letting the number of reproduction channels be represented by I and said received signals of said plural channels by $x_1(k), x_2(k), \ldots, x_I(k)$ as functions of a discrete time k, said received signals $x_1(k), x_2(k), \ldots, x_I(k)$ are multiplied by different functions $g_1(k), g_2(k), \ldots, g_I(k)$ for conversion into signals $\bar{x}_1(k), \bar{x}_2(k), \ldots \bar{x}_I(k)$ which satisfy $\bar{x}_1(k) = g_1(k) \cdot x_1(k)$
$\bar{x}_2(k) = g_2(k) \cdot x_2(k)$
$\bar{x}_I(k) = g_I(k) \cdot x_I(k)$ whereby said variation component of said cross-correlation between said received signal of said plural channels is added thereto.

13. The method of claim 10, wherein letting the number of reproduction channels be represented by I and said received signals of said plural channels by $x_1(k), x_2(k), \ldots, x_I(k)$ as functions of a discrete time k, said received signals $x_1(k), x_2(k), \ldots, x_I(k)$ are added to different functions $n_1(k), n_2(k), n_I(k)$, respectively, for conversion into signals $\bar{x}_1(k), \bar{x}_2(k), \ldots, \bar{x}_I(k)$ which satisfy $\bar{x}_1(k) = x_1(k) + n_1(k)$
$\bar{x}_2(k) = x_2(k) + n_2(k)$
$\bar{x}_I(k) = x_I(k) + n_I(k)$ whereby said variation component of said cross-correlation between said received signal of said plural channels is added thereto.

14. The method of claim 10, wherein letting the number of reproduction channels be represented by I and said received signals of said plural channels by $x_1(k), x_2(k), \ldots, x_I(k)$ as functions of a discrete time k, said received signals $x_1(k), x_2(k), \ldots, x_I(k)$ are converted into signals $\bar{x}_1(k), \bar{x}_2(k), \ldots, \bar{x}_I(k)$ by subjecting the frequency characteristic of each of said received signals to different time-variant frequency axis expansion/compression processing, whereby said variation component of said cross-correlation between said received signal of said plural channels is added thereto.

15. The method of claim 10, wherein the method of adding said variation component of said cross-correlation between said received signals of said plural channels is set optimum in each of said N subbands in a manner to reduce degradation of the psychoacoustic quality of said acoustic signal.

16. The method of any one of claims 1 to 15, wherein said subband received signals and said subband echoes are real-number signals.

17. The method of any one of claims 1 to 15, wherein said subband received signals and said subband echoes are complex signals.

18. A subband echo canceller for a multichannel teleconference in which received signals of plural channels are reproduced as acoustic signals by loudspeakers corresponding to said plural channels, said acoustic signals being received by at least one microphone after propagating over each echo path thereto, an echo replica being subtracted from an echo provided from said at least one microphone, an echo cancellation error signal resulting from said subtraction and said received signal of each of said plural channels being used to calculate an adjustment vector, said adjustment vector being used iteratively to adjust an estimated value of an impulse response of each echo path, estimated echo paths each having said adjusted impulse response being generated for each of said each echo paths, and the corresponding one of said received signals being applied to said each estimated echo path to generate said echo replica, said echo canceller comprising:

subband echo generating means for dividing said received signal and said echo into N subbands in each of said plural channels, and decimating them with predetermined decimation rates, respectively, to generate N subband received signals and N subband echoes, N being an integer equal to or greater than 2;

N estimated echo path means, each formed by a digital filter which is given a filter coefficient of a predetermined number of taps and simulates the impulse response of said echo path in each of said N subbands, said N estimated echo path means being supplied with said N subband received signals and generating N echo replicas, respectively;

error signal generating means for subtracting said N echo replicas from corresponding N subband echoes to generate echo cancellation error signals in said N subbands;

echo path estimating means for iteratively adjusting said filter coefficients of said digital filters in a manner to minimize said N echo cancellation error signals on the basis of said N echo cancellation error signals and said corresponding N subband received signals, said echo path estimation means comprising: cross-correlation variation extracting means for extracting a variation component of the cross-correlation between said received signals of said plural channels, and including adjustment means for using said variation component as said adjustment vector;

subband synthesis means for combining said echo cancellation error signals in said N subbands into a full band send signal having said echoes suppressed.

19. A subband echo canceller for a multichannel teleconference in which received signals of plural channels are reproduced as acoustic signals by loudspeakers corresponding to said plural channels, said acoustic signals being received by at least one microphone after propagating over each echo path thereto, an echo replica being subtracted from an echo provided from said at least one microphone, an echo cancellation error signal resulting from said subtraction and said received signal of each of said plural channels being used to calculate an adjustment vector, said adjustment vector being used iteratively to adjust an estimated value of an impulse response of each echo path, estimated echo paths each having said adjusted impulse response, and the corresponding one of said received signals is applied to said each estimated echo path to generate said echo replica, said echo canceller comprising:

subband echo generating means for dividing said received signal and said echo into N subbands in each of said plural channels and decimating them with predetermined decimation rates, respectively, to generate N subband received signals and N subband echoes, N being an integer equal to or greater than 2;

N estimated echo path means, each formed by a digital filter which is given a filter coefficient of a predetermined number of taps and simulates the impulse response of said echo path in each of said N subbands, said N estimated echo path means being supplied with said N subband received signals and generating N echo replicas, respectively;

error signal generating means for subtracting said N echo replicas from corresponding N subband echoes to generate echo cancellation error signals in said N subbands;

echo path estimating means for iteratively adjusting said filter coefficients of said digital filters in a manner to minimize said N echo cancellation error signals on the basis of said N echo cancellation error signals and said corresponding N subband received signals;

subband synthesis means for combining said echo cancellation error signals in said N subbands into a full band send signal having said echoes suppressed; and cross-correlation variation adding means for adding a variation component of the cross-correlation between said received signals of said plural channels, received signals added with said cross-correlation variation component being used to derive said adjustment vector.

20. The echo canceller of claim 19, wherein said cross-correlation variation adding means is means by which, letting the number of reproduction channels be represented by I and said received signals of said plural channels by $x_1(k), x_2(k), \ldots, x_I(k)$ as functions of a discrete time k, said received signals $x_1(k), x_2(k), \ldots, x_I(k)$ are input into time-variant filters with different time-variant characteristics for said plural channels, wherein they are convoluted, indicated by *, with impulse responses $f_1(k), f_2(k), \ldots, f_I(k)$ of said filters for conversion into signals $\bar{x}_1(k), \bar{x}_2(k), \ldots, \bar{x}_I(k)$ which satisfy $\bar{x}_1(k)=f_1(k)*x_1(k)$
$\bar{x}_2(k)=f_2(k)*x_2(k)$
$\bar{x}_I(k)=f_I(k)*x_I(k)$ whereby said variation component of said cross-correlation between said received signal of said plural channels is added thereto.

21. The echo canceller of claim 19, wherein said cross-correlation variation adding means is means by which, letting the number of reproduction channels be represented by I and said received signals of said plural channels by $x_1(k), x_2(k), \ldots, x_I(k)$ as functions of a discrete time k, said received signals $x_1(k), x_2(k), \ldots, x_I(k)$ are multiplied by different functions $g_1(k), g_2(k), \ldots, g_I(k)$ for conversion into signals $\bar{x}_1(k), \bar{x}_2(k), \ldots, \bar{x}_I(k)$ which satisfy $\bar{x}_1(k)=g_1(k)\cdot x_1(k)$
$\bar{x}_2(k)=g_2(k)\cdot x_2(k)$
$\bar{x}_I(k)=g_I(k)\cdot x_I(k)$ whereby said variation component of said cross-correlation between said received signal of said plural channels is added thereto.

22. The echo canceller of claim 19, wherein said cross-correlation variation adding means is means by which, letting the number of reproduction channels be represented by I and said received signals of said plural channels by $x_1(k), x_2(k), \ldots, x_I(k)$ as functions of a discrete time k, said received signals $x_1(k), x_2(k), \ldots, x_I(k)$ are added to different functions $n_1(k), n_2(k), n_I(k)$, respectively, for conversion into signals $\bar{x}_1(k), \bar{x}_2(k), \ldots, \bar{x}_I(k)$ which satisfy $\bar{x}_1(k)=x_1(k)+n_1(k)$
$\bar{x}_2(k)=x_2(k)+n_2(k)$
$\bar{x}_I(k)=x_I(k)+n_I(k)$ whereby said variation component of said cross-correlation between said received signal of said plural channels is added thereto.

23. The echo canceller of claim 19, wherein said cross-correlation variation adding means is means by which, letting the number of reproduction channels be represented by I and said received signals of said plural channels by $x_1(k), x_2(k), \ldots, x_I(k)$ as functions of a discrete time k, said received signals $x_1(k), x_2(k), \ldots, x_I(k)$ are converted into signals $\bar{x}_1(k), \bar{x}_2(k), \ldots, \bar{x}_I(k)$ by subjecting the frequency characteristic of each of said received signals to different time-variant frequency axis expansion/compression processing, whereby said variation component of said cross-correlation between said received signal of said plural channels is added thereto.

24. The echo canceller of any one of claims 18 to 23, wherein said subband received signals and said subband echoes are real-number signals.

25. The echo canceller of any one of claims 18–23, wherein said subband received signals and said subband echoes are complex signals.

* * * * *